Nov. 30, 1965  J. L. QUINN ETAL  3,221,147
APPARATUS FOR READING CHARACTER REPRESENTATIVE INDICIA
Filed Jan. 23, 1961  18 Sheets-Sheet 1
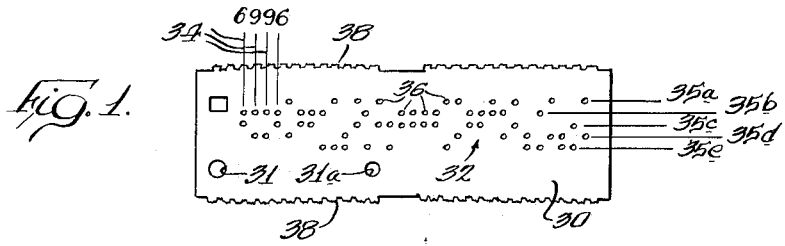
INVENTORS:
James L. Quinn
Christof Stary
By
Wolf, Hubbard, Voit & Osann
Attys

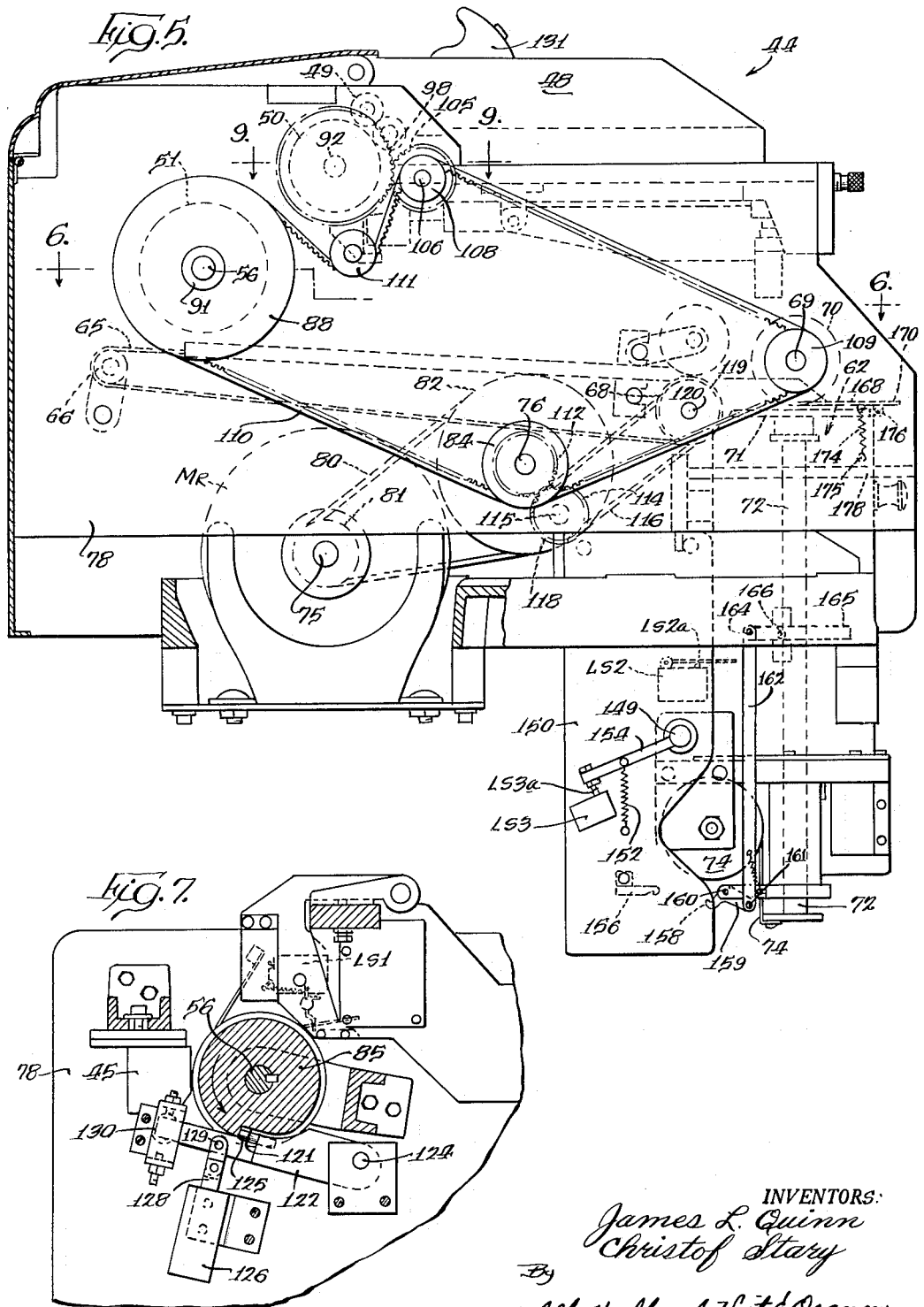

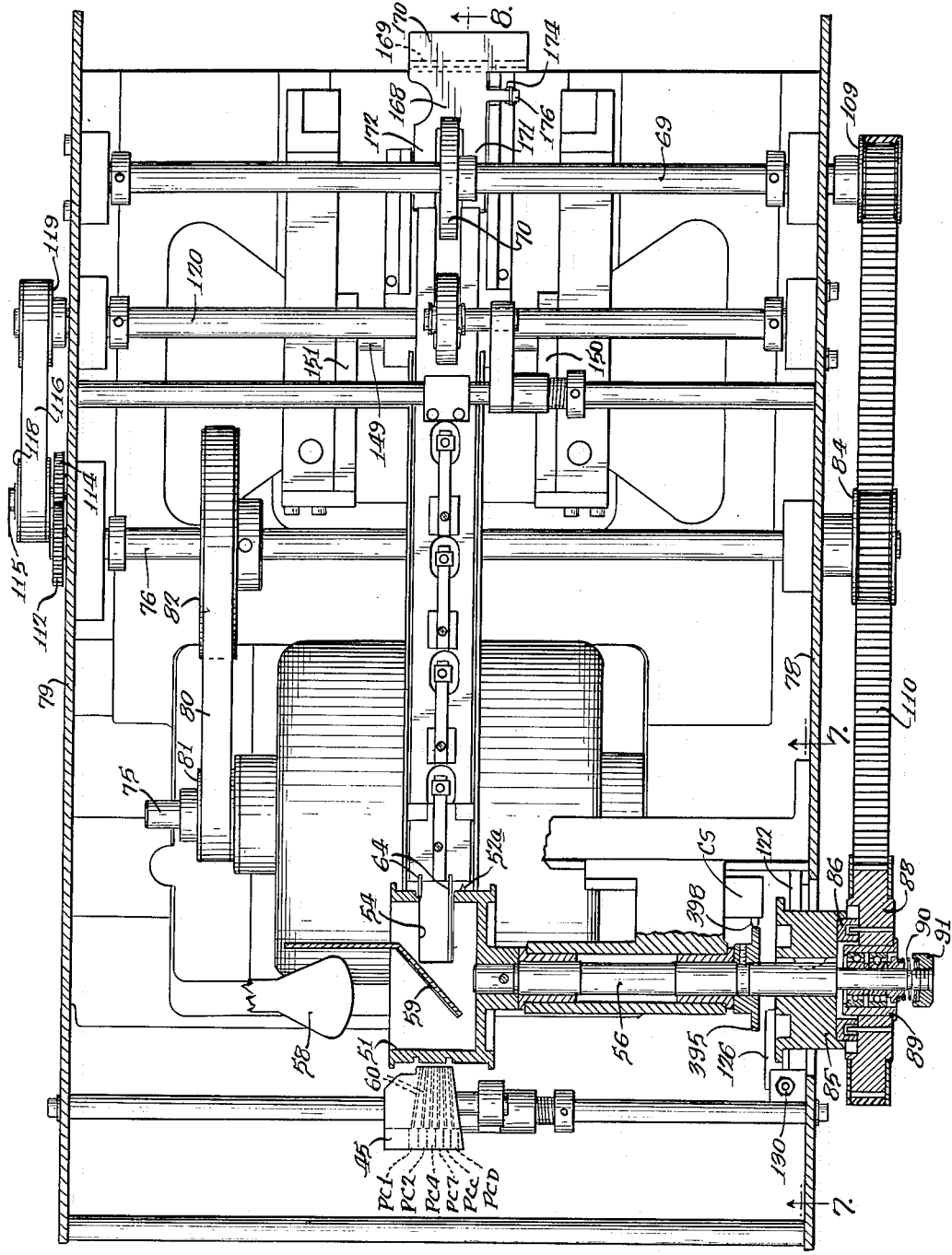

Nov. 30, 1965  J. L. QUINN ETAL  3,221,147
APPARATUS FOR READING CHARACTER REPRESENTATIVE INDICIA
Filed Jan. 23, 1961  18 Sheets-Sheet 4
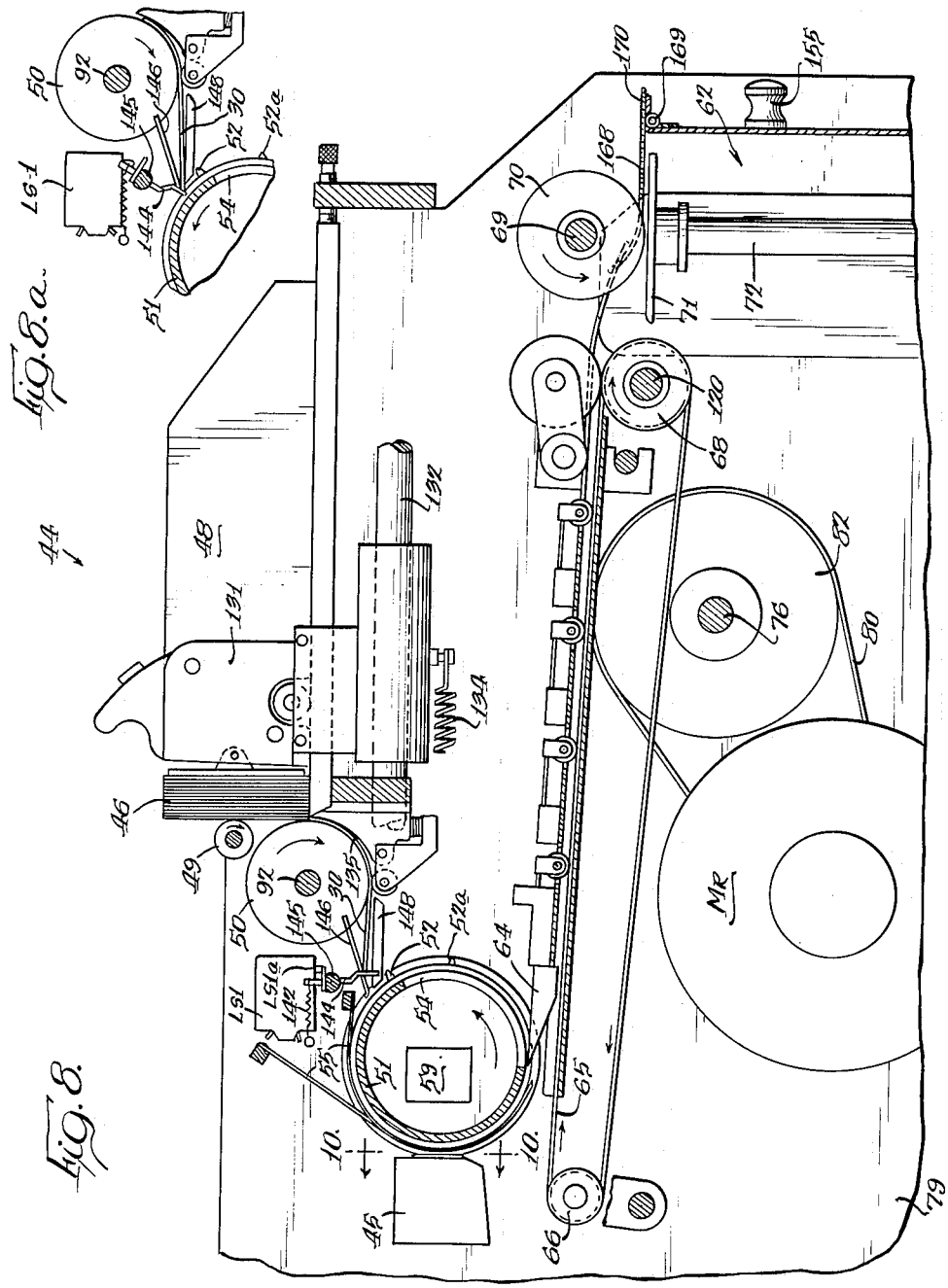
INVENTORS:
James L. Quinn
Christof Stary
By
Wolf, Hubbard, Voit & Osann
Attys Nov. 30, 1965

J. L. QUINN ETAL 3,221,147

APPARATUS FOR READING CHARACTER REPRESENTATIVE INDICIA

Filed Jan. 23, 1961

INVENTORS:
James L. Quinn
Christof Stary
By
Wolfe, Hubbard, Voit & Osann
Att'ys

Nov. 30, 1965    J. L. QUINN ETAL    3,221,147
APPARATUS FOR READING CHARACTER REPRESENTATIVE INDICIA
Filed Jan. 23, 1961    18 Sheets-Sheet 6
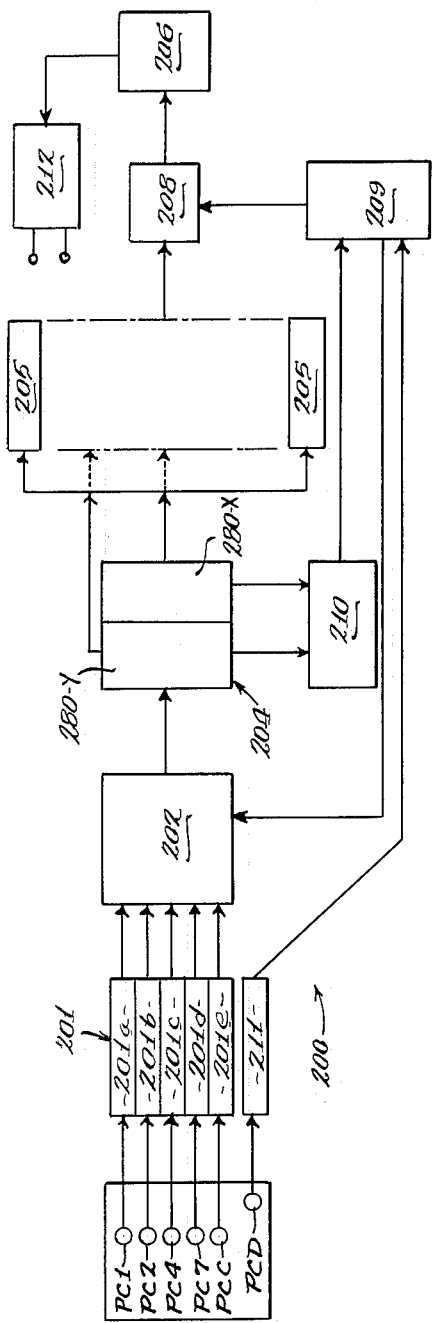
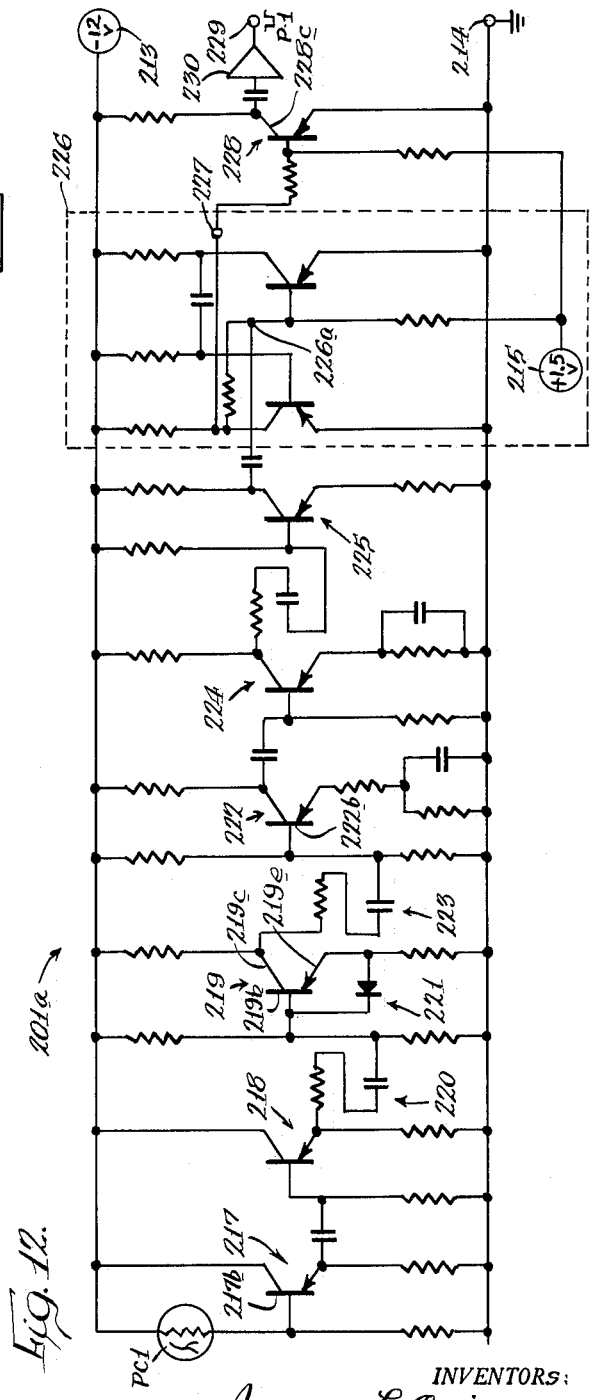
INVENTORS:
James L. Quinn
Christof Stary
By
Wolfe, Hubbard, Voit & Osann
Attys

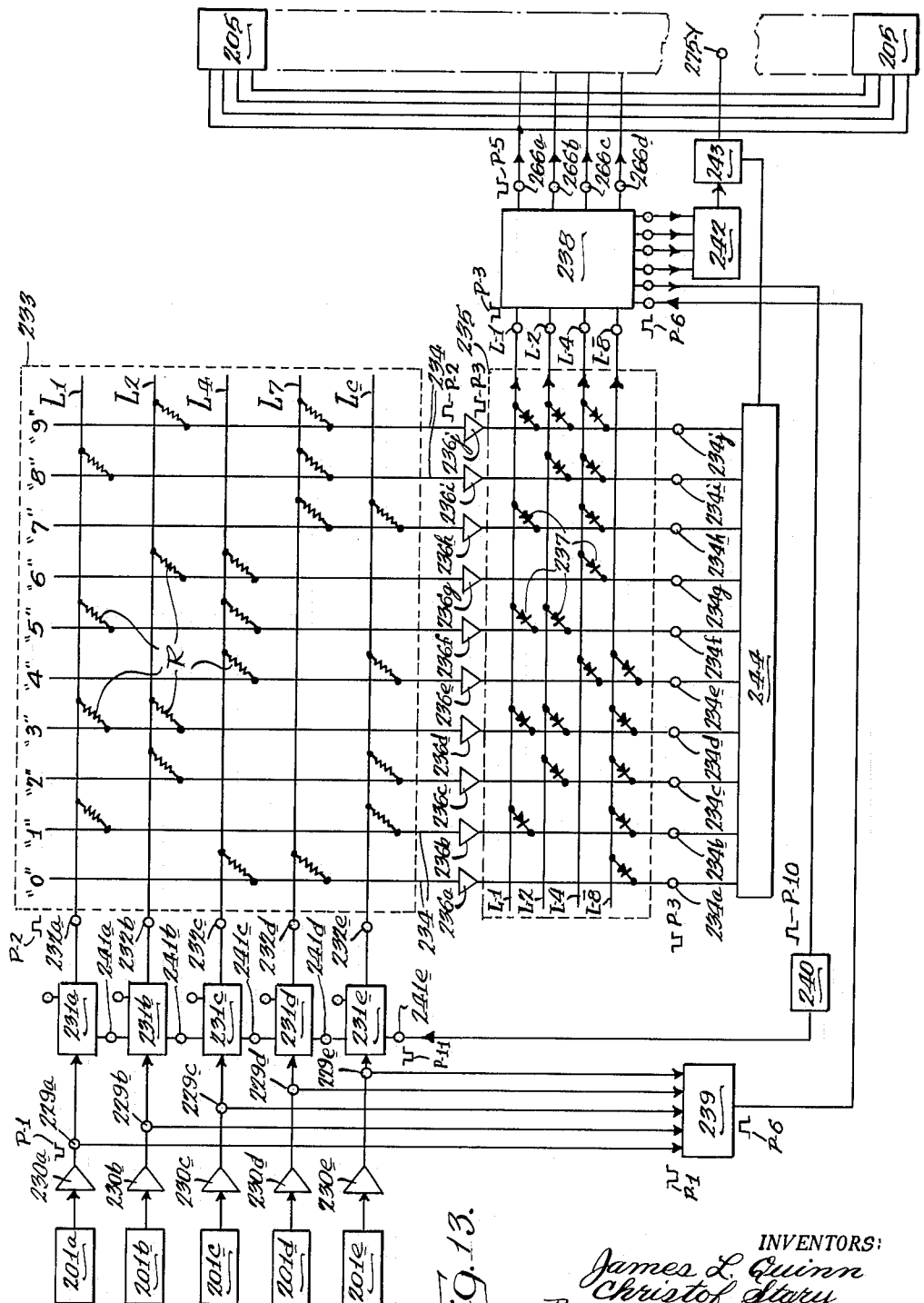

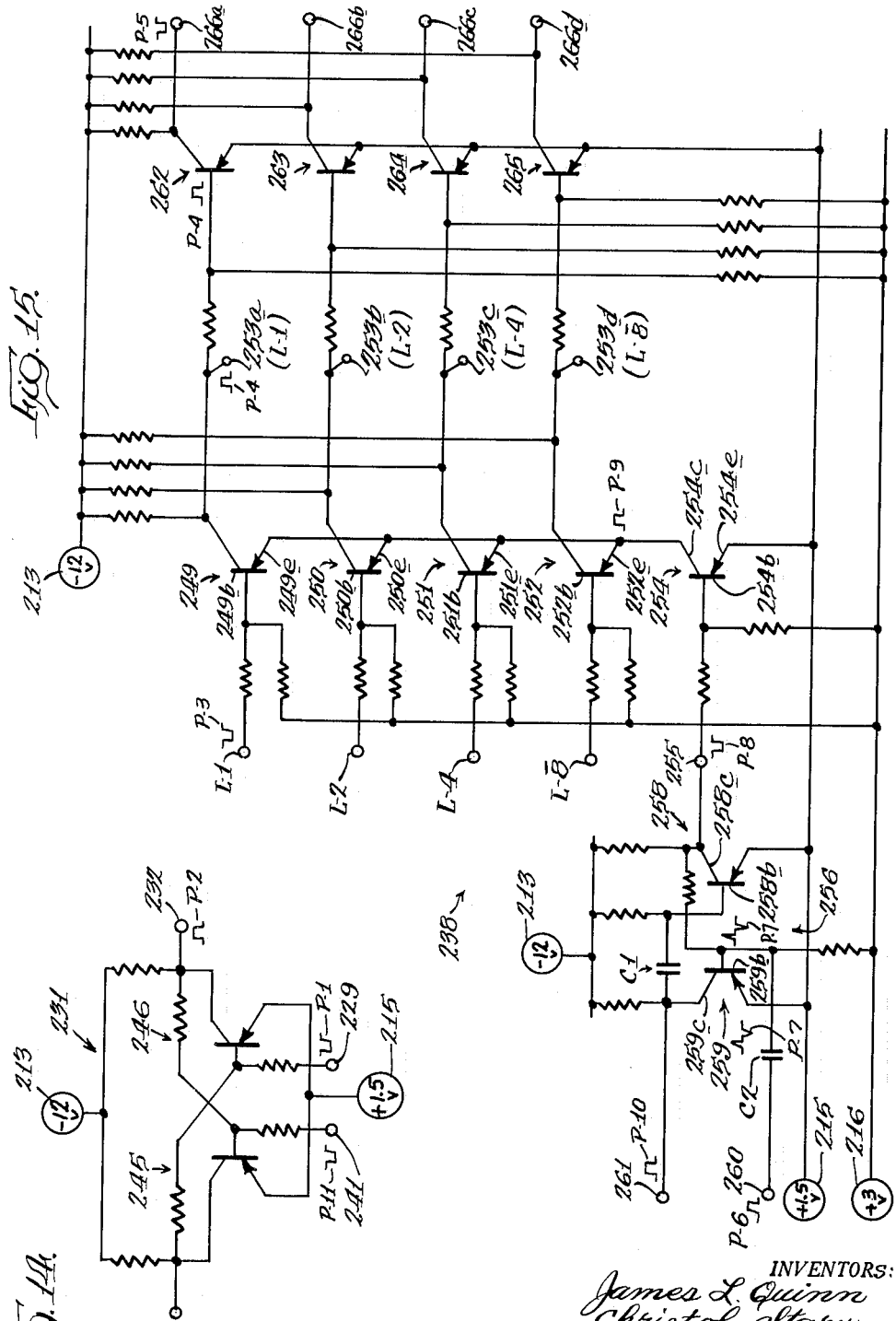

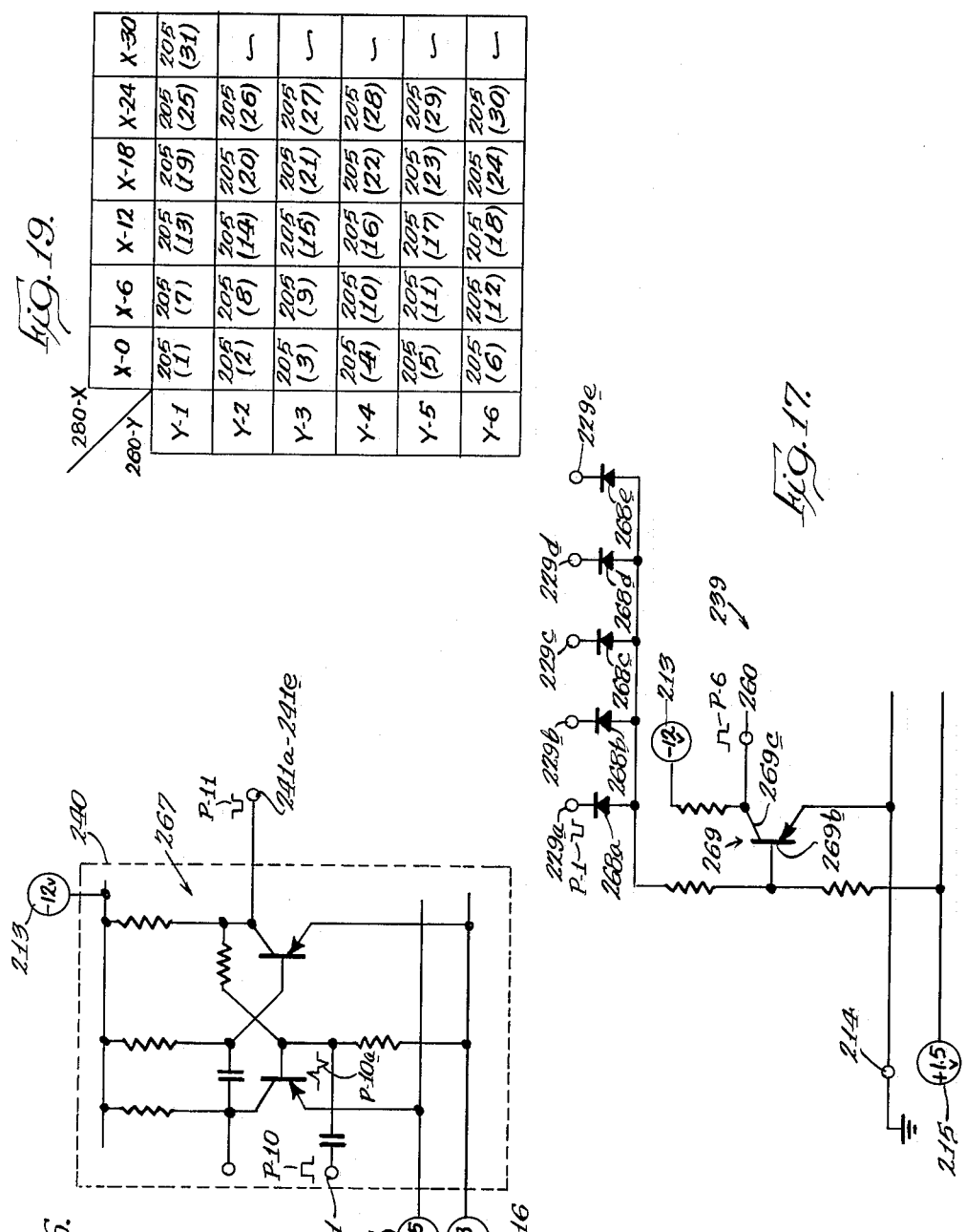

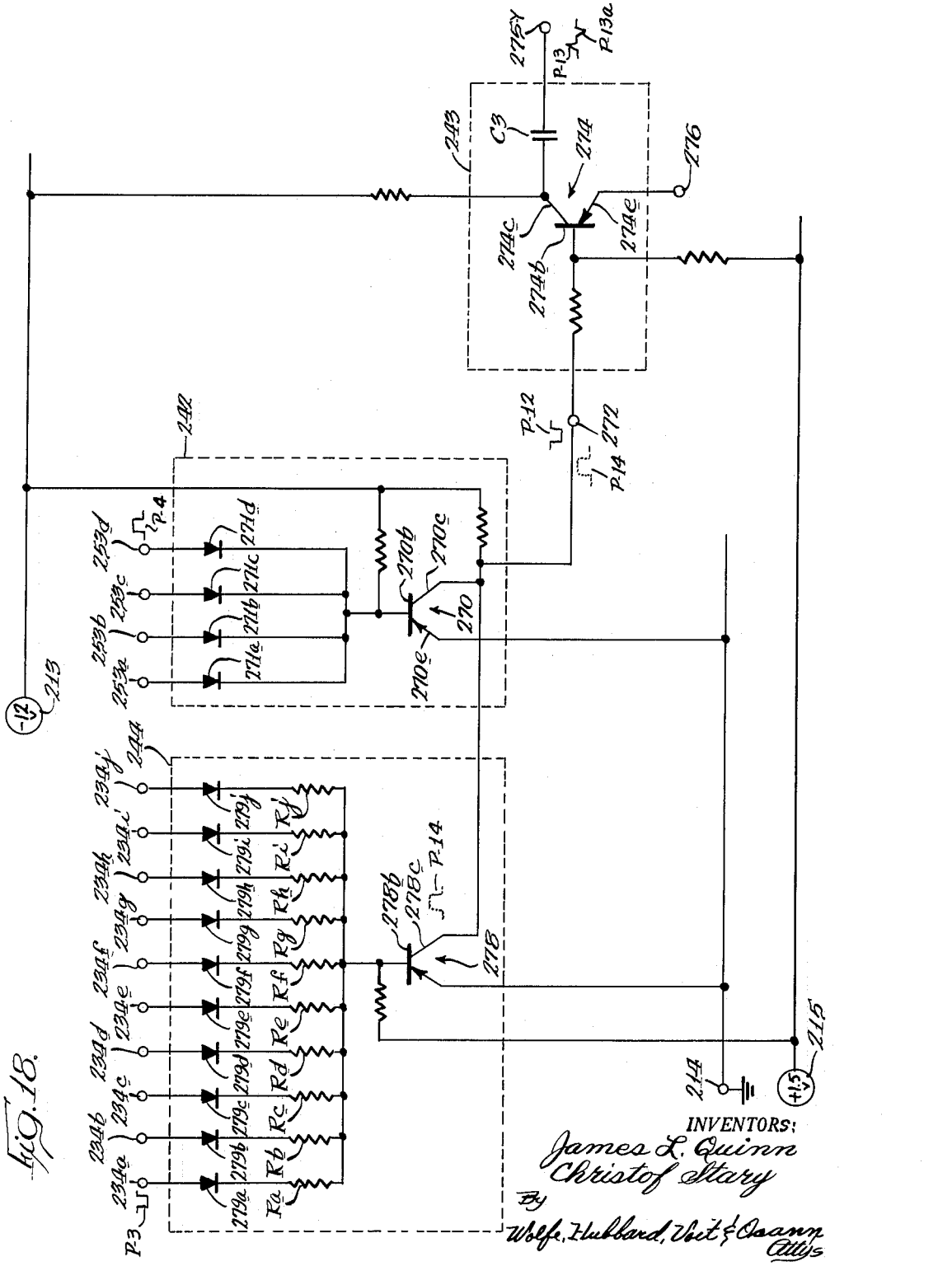

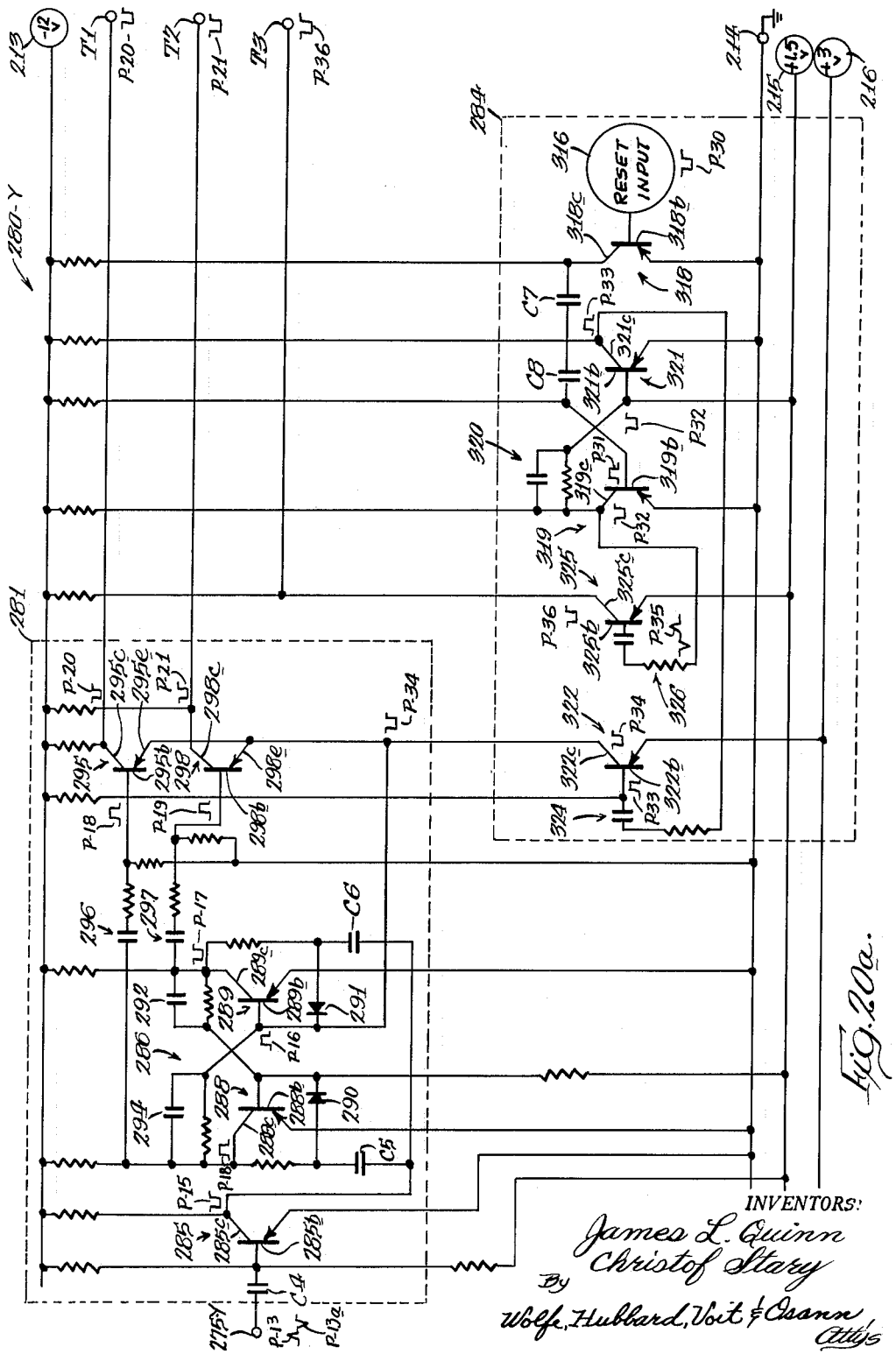

Nov. 30, 1965  J. L. QUINN ETAL  3,221,147
APPARATUS FOR READING CHARACTER REPRESENTATIVE INDICIA
Filed Jan. 23, 1961  18 Sheets-Sheet 12
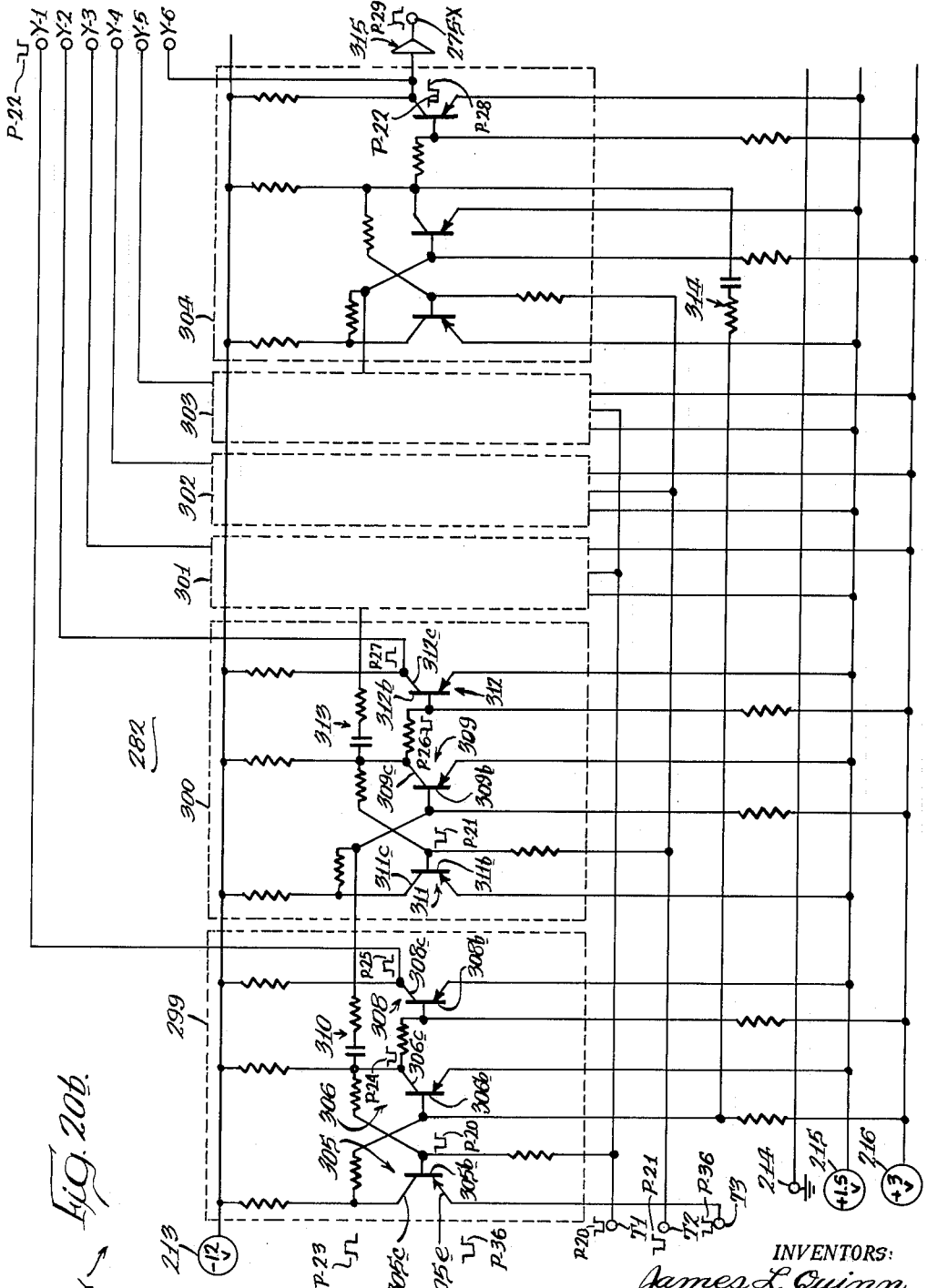
INVENTORS:
James L. Quinn
Christof Stary
By
Wolfe, Hubbard, Voit & Osann
Att'ys

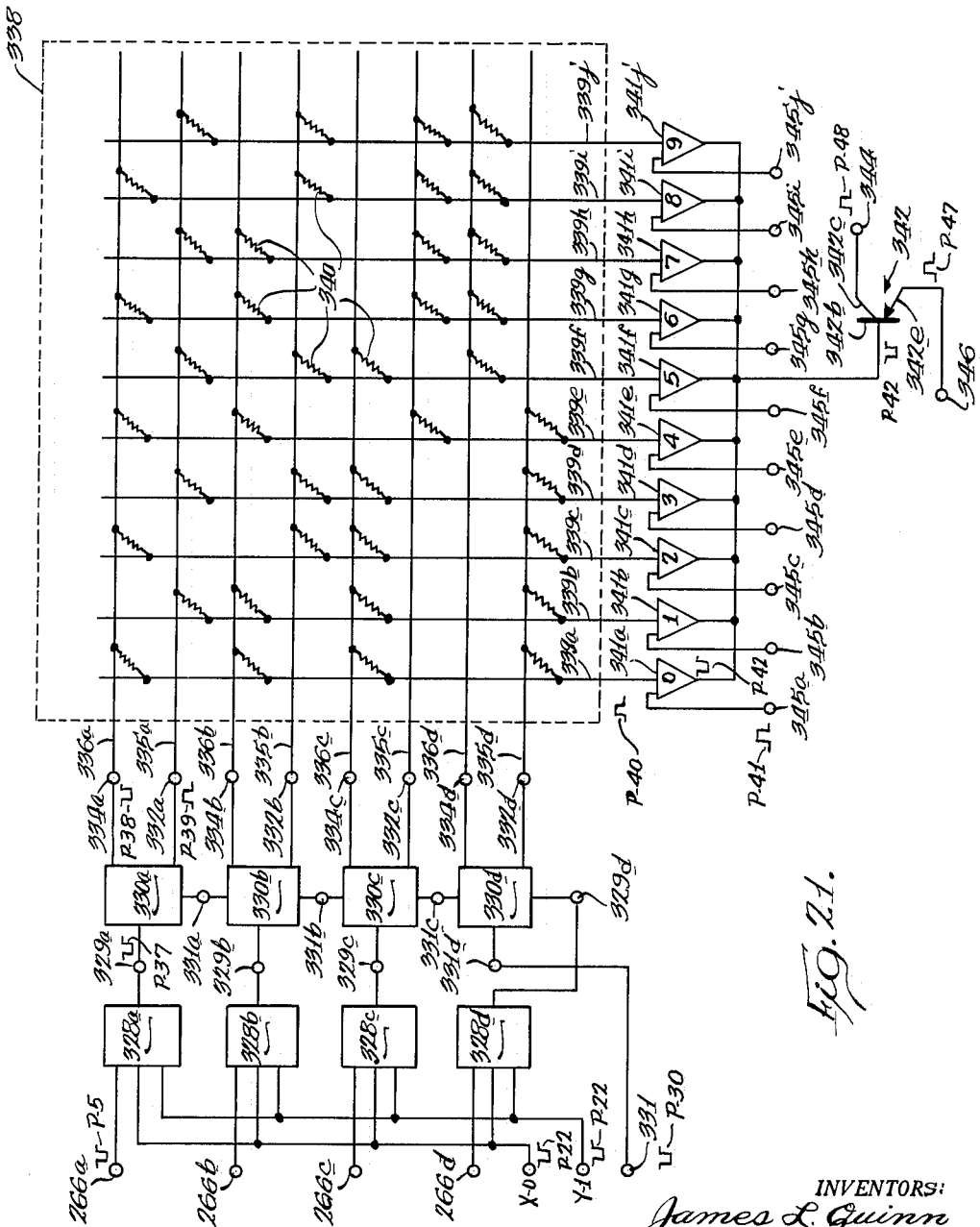

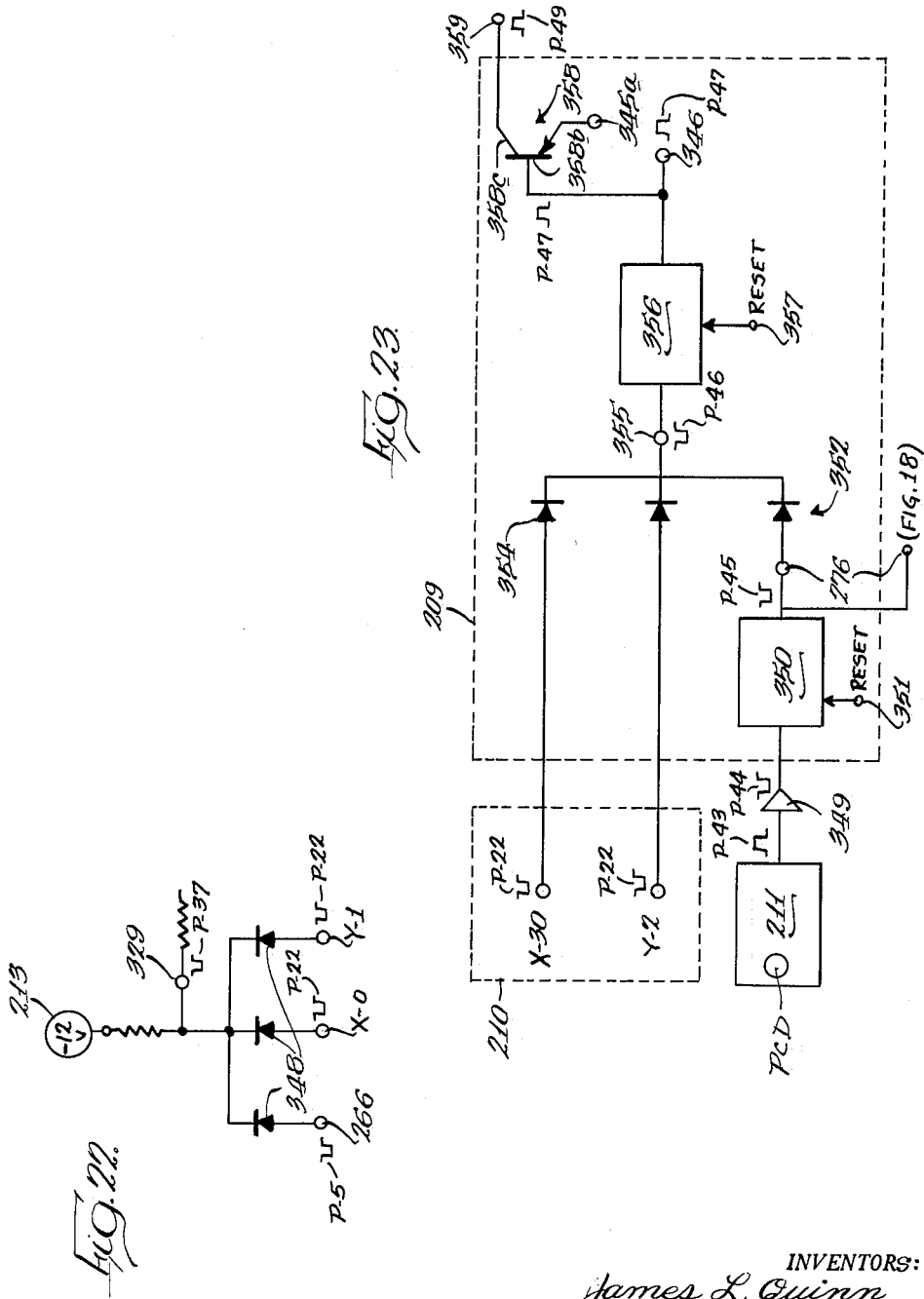

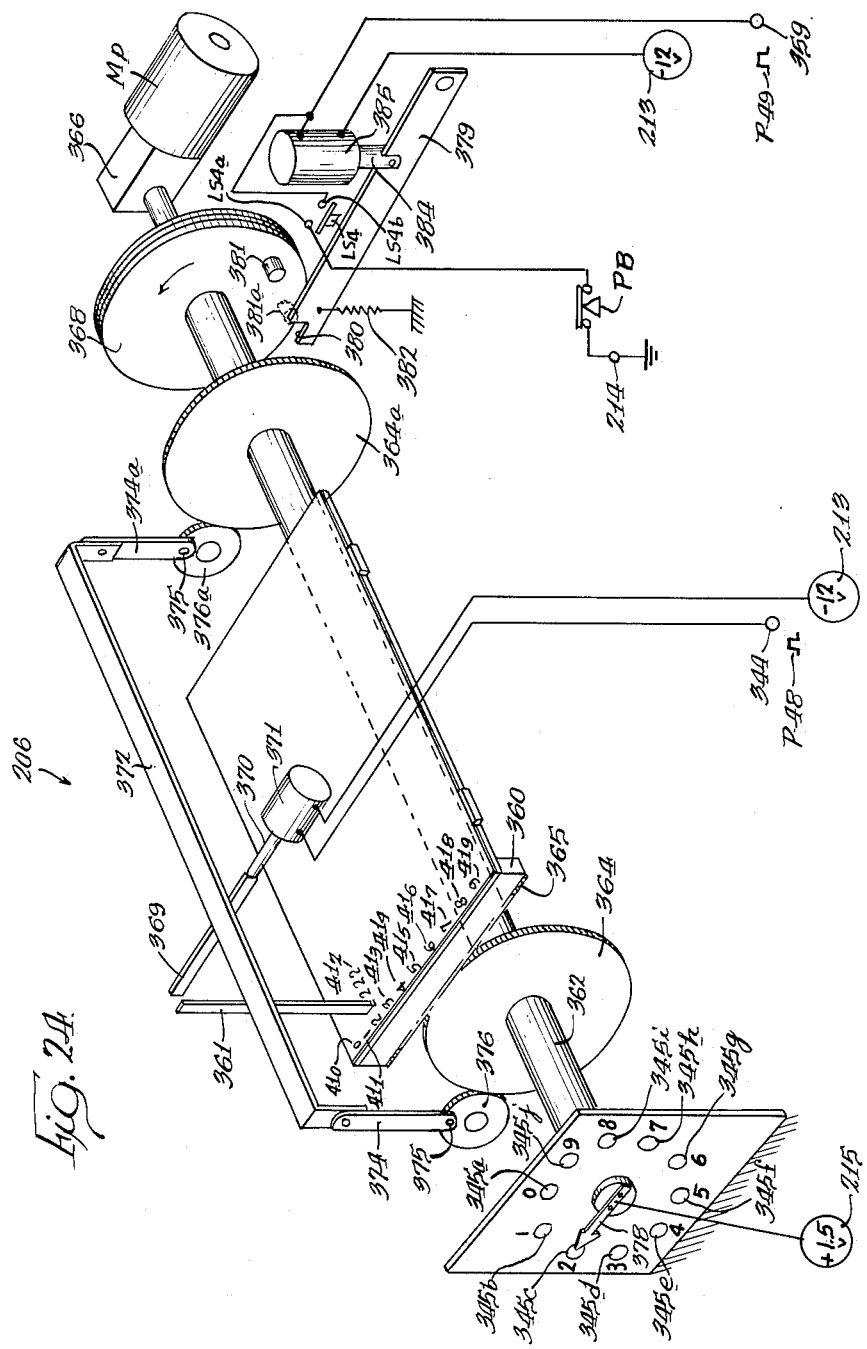

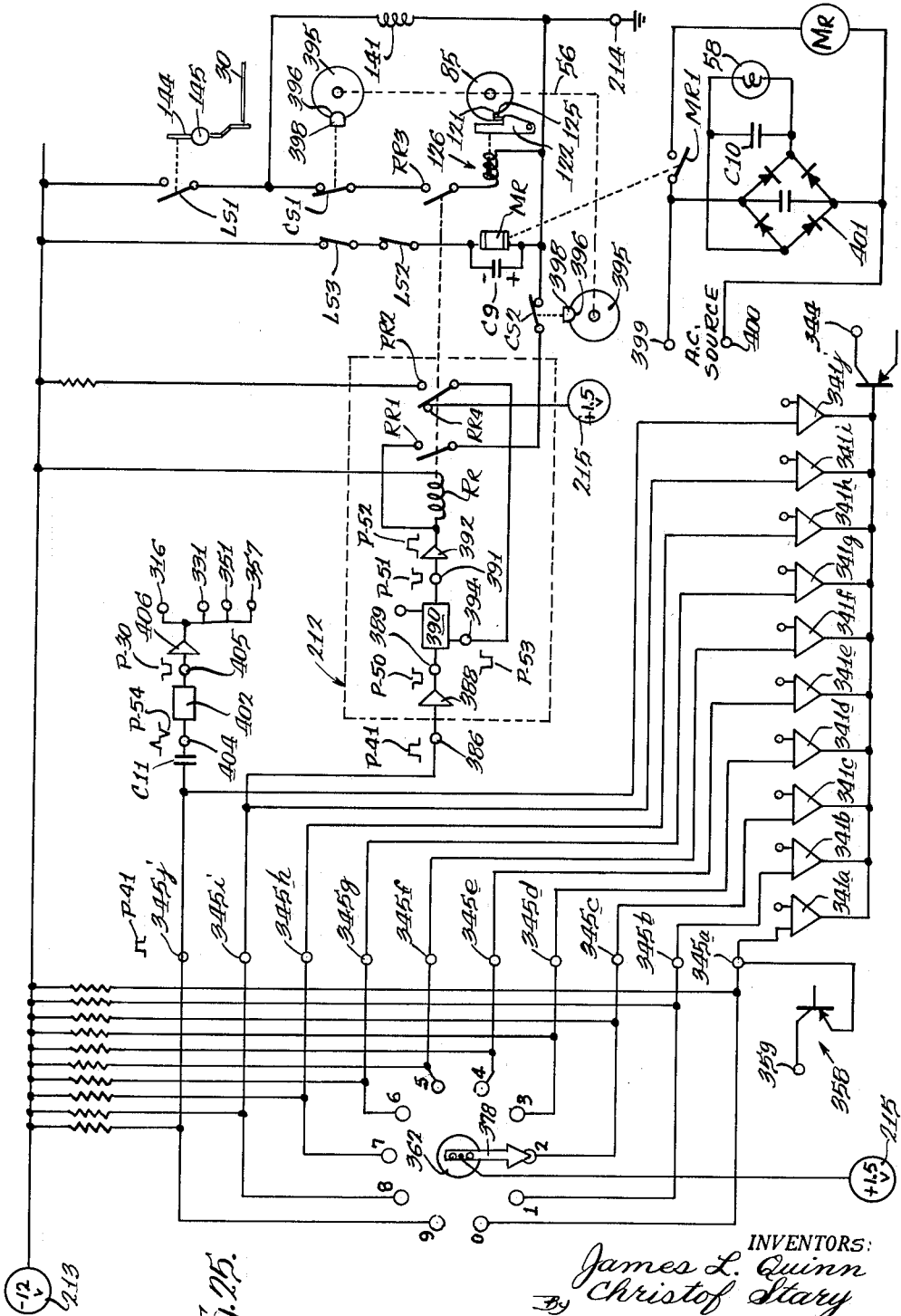

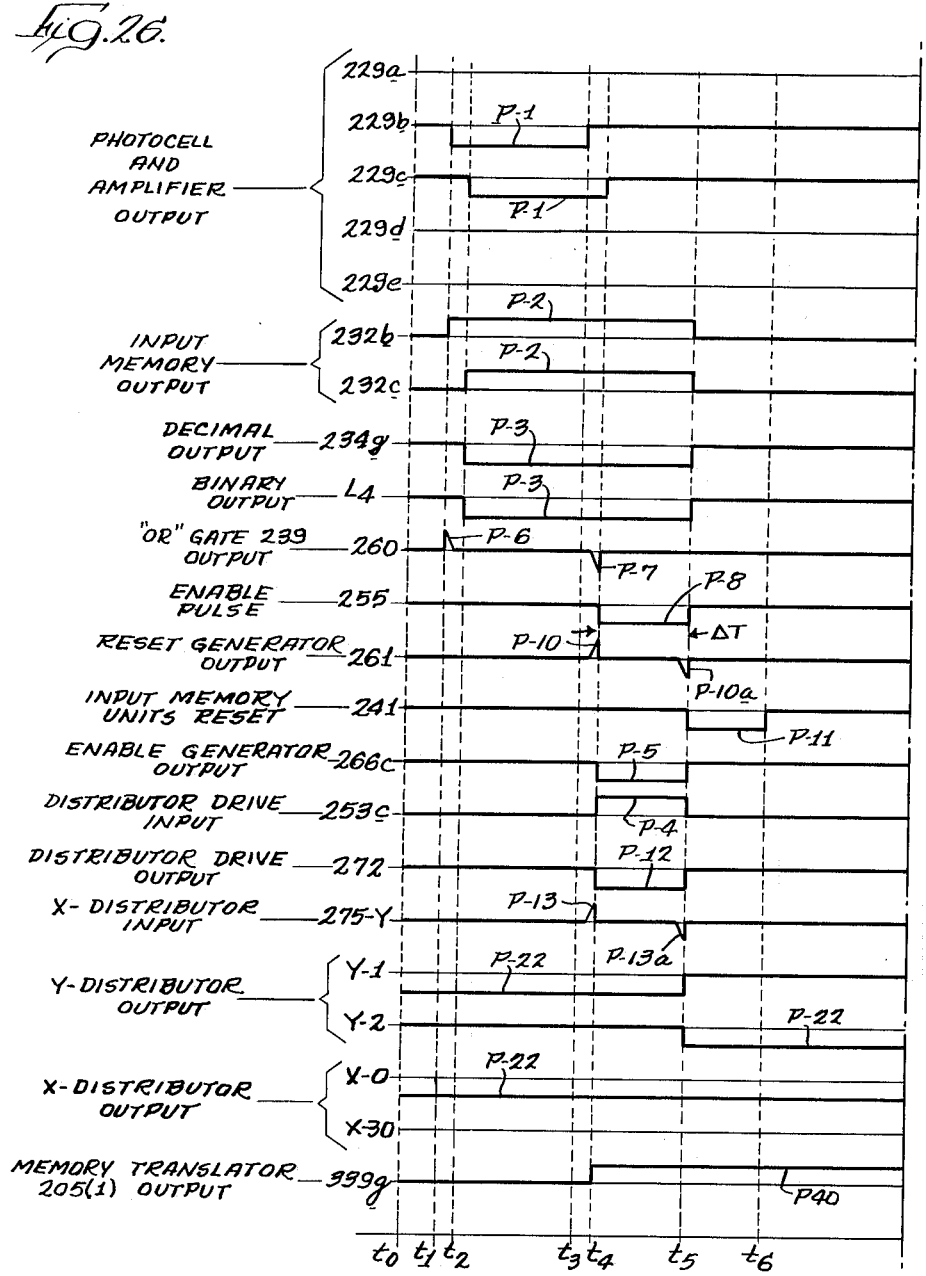

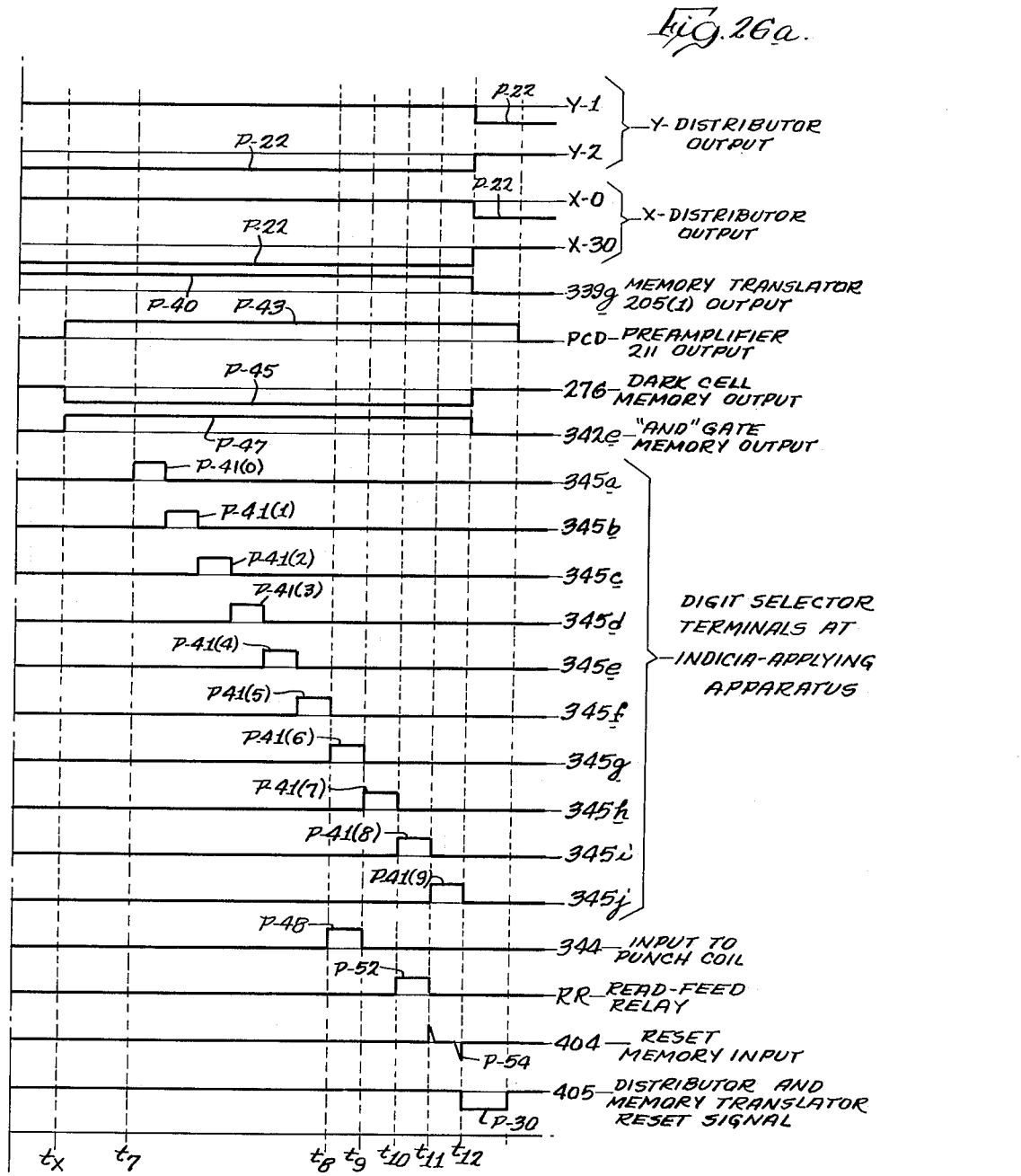

United States Patent Office 3,221,147
Patented Nov. 30, 1965

3,221,147
APPARATUS FOR READING CHARACTER REPRESENTATIVE INDICIA
James L. Quinn and Christof Stary, Chicago, Ill., assignors to Cummins-Chicago Corp., Chicago, Ill., a corporation of Illinois
Filed Jan. 23, 1961, Ser. No. 84,080
12 Claims. (Cl. 235—61.11)

The present invention relates in general to business machines and in particular to apparatus for reading characters, represented as either legible or illegible indicia, on successive ones of a plurality of documents. In its principal aspects, the invention is concerned with "reading" character-representing indicia from a document and creating a corresponding set of character-representing signals which are acceptable as the input of utilization apparatus such as a data processor or a data reproducer which applies the characters to a second document.

In recent years there has been a widespread trend towards automation of business accounting systems. It has been found that much time and labor can be saved by recording identifying material, accounting data or the like, directly in the form of coded indicia on coupons, tags or other documents. Such indicia is then readily available for "reading" by mechanical and electrical input components of a data processor. Typical coupons generally contain accounting information in the form of perforations disposed at different combinations of stations in a five-place, in-line code, with the combination of perforations in each line representing any particular one of a plurality of characters. Where numerous characters are applied to the coupon, the coded information takes the form of an elongated rectangular field of perforations. In order to accommodate the field of character representative indicia, the coupons employed are rectangular in shape and, when separated from a sheet of similar coupons along perforated lines, include ragged edges on one or both of the long coupon edges. This has resulted in inefficient feeding of the coupons to reading apparatus and misalinement of the field relative to the indicia sensing elements. These disadvantages are particularly objectionable when the reading apparatus employed includes indicia sensing elements which simultaneously read the entire perforation field in a single coupon.

It is the general aim of the present invention to facilitate the reading of coded indicia in the form of a rectangular field formed on a business document. While not so limited in its application, the invention will find especially advantageous use in transmitting output signals representative of the characters sensed to a conventional row-by-row indicia-applying apparatus which records the same characters in a different form or code on a second document.

Another object of the invention is to eliminate objectionable feeding and misalinement problems which result from the ragged coupon edges. In this connection, it is an object of the invention to provide improved reading apparatus characterized by its ability to successively accept documents fed endwise, i.e., so that indicia for all characters moves simultaneously and in parallel into the reading apparatus and to transmit output signals representative of each of the characters read in serial order from any one document.

A further object of the invention is to provide a highly versatile business document reading apparatus in which successive documents are entered and read only upon demand of the data processor receiving signals representative of the information read, thus allowing like characters of a plurality of serially read characters to be processed simultaneously.

More specifically, it is an object of the invention to provide an improved feeding mechanism for an indicia-reading apparatus wherein feeding of each successive document to the reader is initiated only after the preceding document has entered upon a reading cycle.

Another object of the invention is to provide a high speed data processing system where in coded information read in serial order from a plurality of successive first documents may be produced on a plurality of corresponding successive second documents in row-by-row order.

These and other objects and advantages of the present invention will become apparent as the following description proceeds, taken in conjunction with the accompanying drawings, in which:

FIGURE 1 illustrates a typical first document or master coupon containing a perforation field representing an exemplary set of coded information which is to be processed and re-applied to a second document;

FIG. 2 is a chart disclosing an exemplary perforation code utilized to represent characters on the document shown in FIG. 1;

FIG. 3 is a chart disclosing a typical binary code system which is particularly suitable for use in storing the coded information read from the first document preparatory to processing the second document;

FIG. 4 illustrates a typical second document or record card having imprinted thereon a plurality of columns, one for each character to be represented, and in which the character is represented by the position of a perforation or other mark, i.e., according to a decimal position code;

FIG. 5 is a side elevation, partially in section, of the mechanical portions of reading apparatus embodying the features of the present invention;

FIG. 6 is a sectional view taken substantially along the offset line 6—6 in FIG. 5, and showing details of the drive of the reader drum;

FIG. 7 is a sectional view taken substantially along the line 7—7 of FIG. 6 and illustrating the mechanism employed for synchronizing rotation of the reader drum in accordance with demand signals emanating from a data processor;

FIG. 8 is a central section taken substantially along the line 8—8 of FIG. 6 and illustrating the condition of the document feeding mechanism just prior to braking thereof;

FIG. 8a is a fragmentary section similar to FIG. 8 illustrating the feeding mechanism just after braking occurs;

FIG. 11 is a block diagram of a buffer storage assembly utilized to store output signals emanating from the reading apparatus illustrated in FIG. 5 prior to demand by a data processor;

FIG. 12 is a schematic circuit diagram showing the details of a typical preamplifier and pulse shaping circuit used in connection with the buffer storage assembly of FIG. 11;

FIG. 13 is a schematic illustration, partially in block-and-line form, of the input memory translator shown in FIG. 11;

FIG. 14 is a schematic circuit diagram illustrating an exemplary organization for the several memory units of FIG. 13;

FIG. 15 is a schematic circuit diagram illustrating an exemplary organization of the enable generator of FIG. 13;

FIG. 16 is a schematic circuit diagram showing details of the exemplary reset generator shown in FIG. 13;

FIG. 17 is a schematic circuit diagram illustrating an exemplary organization for the "or" gate shown in FIG. 13;

FIG. 18 is a schematic circuit diagram showing a typical organization of components for the distributor drive, the distributor drive inhibitor and the valid character detector shown in FIG. 13;

FIG. 19 is a chart illustrating a typical address code which may be utilized to sequentially step the distributors shown in FIG. 11;

FIGS. 20a and 20b are schematic circuit diagrams showing exemplary details of one of the distributors utilized with the buffer storage assembly shown in FIG. 11;

FIG. 21 is a schematic circuit diagram illustrating an exemplary organization for the several memory translators of FIG. 11;

FIG. 22 is a schematic circuit diagram showing the details of one of the exemplary "and" gates of FIG. 21;

FIG. 23 is a schematic illustration, partially in block-and-line form, of the details of the exemplary punch suppressor and word-length detector shown in FIG. 11;

FIG. 24 is a diagrammatic perspective view of a typical row-by-row punching apparatus, including the controls therefor, which may be utilized in conjunction with the present invention;

FIG. 25 is a schematic circuit diagram, partially in block-and-line form, showing an exemplary organization of components for synchronizing the reading apparatus of FIG. 5 with the punching apparatus shown in FIG. 24; and FIGS. 26 and 26a are graphic illustrations showing the timing relationships of the various signals that occur as successive characters and successive coupons are read.

Figure 9:
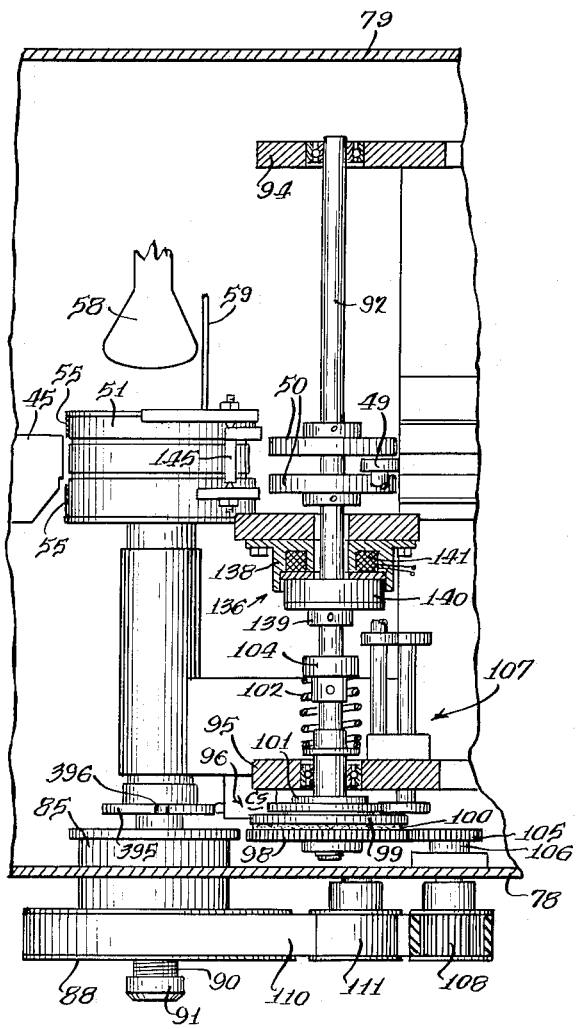
FIG. 9 is a fragmentary section taken substantially along the line 9—9 of FIG. 5 and illustrating the driving and braking mechanisms for the feed rolls.

While the invention has been illustrated and will be described in detail with reference to a preferred embodiment thereof, there is no intention that it thus be limited to such detail. On the contrary, it is intended here to cover all equivalents, modifications and alternatives falling within the spirit and scope of the invention as defined by the appended claims.

The exemplary embodiment of the invention here illustrated is intended to successively accept first documents bearing coded indicia representative of a plurality of particular characters, to sense in serial order the particular characters represented by the coded indicia, and to transmit output signals in response to the information sensed, which signals can be subsequently utilized by conventional indicia-applying apparatus for processing second documents. Such first documents may typically take the form of a master coupon 30 (FIG. 1) having a pair of large openings 31, 31a formed therein at a reference spacing from a rectangular perforation field 32. In the illustrative case, the field 32 is made up of one hundred and fifty-five stations arranged in thirty-one columns 34 and five rows 35a–35e. Each station, represented by the intersection of imaginary vertical and horizontal lines, may be blank or may have a perforation formed therein, the particular combination of perforations in each column 34 representing a particular character according to a predetermined code. Thus, it will be appreciated that the exemplary coupon 30 bears coded indicia representative of thirty-one particular characters.

Each individual character is represented on each coupon 30 by a single column 34 of perforations 36, the perforations being arbitrarily located in each column to conform with any selected code system. For example, in the in-line, five place code shown in FIG. 2, the characters "0" through "9" may be represented by perforations located in different combinations of levels, there being five such levels $L_1$, $L_2$, $L_4$, $L_7$ and $L_c$ respectively corresponding to the rows 35a–35e of perforations 36 in the coupon. Thus, to represent the character "3," for example, it is merely necessary that perforations 36 be located at rows 35a and 35b (corresponding to level $L_1$ and $L_2$ in FIG. 2) within a single column 34. It will be immediately apparent by reference to FIG. 2, that each of the characters "0" through "9" is represented by two and only two perforations.

It will be appreciated that several coupons 30 may be formed from a single sheet of relatively stiff material simply by tearing the sheet along spaced, scored lines. When this is done, the separated coupons 30 have at least one, and often two ragged edges 38 at the tear line, as clearly indicated in FIG. 1.

Referring now to FIG. 4, there is illustrated a portion of a typical second document here shown as a record card 39, which is to be processed by applying thereto character indicia corresponding to the character indicia appearing on the master coupon 30. Such a card, for example, may simply take the form of a rectangular array of n-columns 40 and ten rows $41_0$–$41_9$, the rows respectively corresponding to the characters "0"–"9." Each row 41 includes n-character positions, the actual number of character positions being dependent upon the number of columns 40 imprinted on the card 39.

Let it be assumed, just by way of example, that it is desired to reproduce the coded character information appearing in the first four columns 34 of the master coupon 30 (the four left-hand columns as viewed in FIG. 1) in the first four columns 40 of the record card 39 (the four left-hand columns as viewed in FIG. 4). It will be apparent that the selected columns 34 on the coupon 30 are representative of the number "6996" in accordance with the code system illustrated in FIG. 2. Therefore, when this information is processed on the record card 39, perforations 42 will be respectively located at row 41 (the row corresponding to the character "6") in the first and fourth columns 40, and at row 41a (corresponding to the character "9") in the second and third columns 40. Of course, it will be appreciated that the master coupon 30 may contain greater or fewer than the illustrated thirty-one character columns 34 and that the record cards 39 will generally contain considerably more than the illustrated thirty-one columns 40. In such a case, it is merely necessary to preset the apparatus selected to apply indicia to the card 39 so that the individual characters appearing on the coupon 30 will be produced at predesignated columns 40 on the record cards.

Since each character appearing on the coupon 30 is denoted by a predetermined combination of perforations at each level in a single column 34, the information applied to a particular coupon may be rapidly "read" by appropriate reading equipment that is responsive to the presence or absence of a perforation 36 at each station in the field 32. Such equipment identifies each individual character in serial order and supplies appropriate signals representative of the character sensed to related equipment such as a buffer storage assembly (illustrated in block form at 200 in FIG. 11) for subsequently processing a record card 39 in row-by-row order upon demand of an indicia-applying apparatus, for example, a row-by-row punch 206 (FIG. 24).

The present invention is concerned primarily with an improved apparatus 44 (FIG. 5) for successively accepting a plurality of coupons 30, each having in-lined coded indicia representative of a plurality of particular characters; sensing in serial order the characters presented on each coupon; and for transmitting output signals representative of each character which may subsequently be utilized to process a business document such as the card 39 (FIG. 4). The reading apparatus 44 is here disclosed in conjunction with a buffer storage assembly 200 (FIG. 11) which is disclosed and claimed in the copending application of Aaron B. Aronson, Serial No. 84,060, filed January 23, 1961, and assigned to the assignee of the present invention.

In carrying out the present invention, provision is made for serially reading the columns 34 of character indicia in each master coupon 30 as the coupons are moved successively past a reading head 45. For this purpose, a stack 46 (FIG. 8) of coupons 30 are positioned in a supply hopper 48 of a feeding and alinement device (FIG. 5). The coupons are fed one at a time from the hopper 48 by a start roll 49 and a pair of co-axial feed rolls 50 to a reader drum 51 having a pair of circumferentially spaced, radially projecting teeth 52, 52a (FIG. 8) positioned to register with the openings 31, 31a respectively in each coupon 30. The drum 51 is further provided with an arcuate slot 54 having a reference spacing from the teeth 52, 52a so that when a coupon 30 is engaged with the teeth, the perforation field 32 is registered with the slot 54. As each coupon is engaged with the teeth 52, 52a on the drum 51 and carried by the latter through an arc, it is firmly held against the drum surface by means of a pair of tensioned flexible hold-down straps 55.

The drum 51 is mounted on a shaft 56 journaled in the frame of the reading apparatus 44 (FIG. 6) in such a manner that upon rotation of the drum, the arcuate slot 54 and the coupon perforation field 32 are brought into registration with the reading head 45. In the exemplary form of the invention, the reading head includes a plurality of indicia sensing elements, which here take the form of photosensitive elements of photocells. A light source, here shown as a lamp 58, is mounted on the frame of the reading apparatus 44 and is utilized to project a beam of light into the drum 51 and toward a reflecting surface, for example, a mirror 59 which serves to redirect the light beam radially relative to the drum 51 through the arcuate slot 54 and toward the photoelectric sensing elements carried by the reading head 45.

Figure 10:
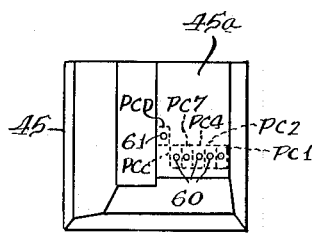
FIG. 10 is a face view of the reading head, taken substantially along the line 10—10 of FIG. 8.

The inner face 45a (FIG. 10) of the reading head 45 is formed with a linear array of small openings or light transmitting passages 60 which are positioned to respectively register with the stations in each column 34 of the coupon perforation field 32 as the columns move successively past the reading head. The light transmitting passages 60 communicate with the exposed active ends of five photoelectric elements PC1, PC2, PC4, PC7 and PCC, which respectively correspond to the levels $L_1$, $L_2$, $L_4$, $L_7$ and $L_c$ of the code system illustrated in FIG 2. Thus, as each column 34 is brought into registration with the openings 60, light is reflected from the mirror 59 through the two coupon stations having a perforation formed therein, thus activating the corresponding two photocells. Since the remaining three coupon stations in the particular column do not have perforations formed therein, the coupon 30 will mask their associated openings 60 and the corresponding photocells will not be activated.

In addition to those photosensitive elements previously noted, the reading head 45 also includes an "end-of-document" photocell PCD having its exposed active end in communication with a light transmitting passage 61 formed in the inner face 45a of the reading head 45. The photocell PCD does not serve to sense the presence or absence of perforations within the coupon 30, but rather is simply masked from the lamp 58 whenever a coupon is passing in front of the reading head 45. When an entire coupon has transited the reading head, light is transmitted from the mirrored surface 59 through the light transmitting aperture 61 to the photocell PCD, thus energizing the photocell and generating a signal indicating that the entire coupon has been "read."

After each coupon has been read, provision is made for stripping it from the reader drum 51 and for transporting it to a stacker assembly 62 (FIGS. 5 and 8). To accomplish this, a stripper blade 64 is positioned adjacent the lower side of the reader drum 51 in such a manner as to strip each coupon 30 from the drum 51 and to deposit it on a continuously moving belt 65 carried by sprockets 66, 68, the belt serving to carry the coupons to the stacker assembly 62. In order to insure that the coupons 30 are properly positioned within the stacker assembly 62, a shaft 69 supports a continuously rotating roller 70 which engages the upper surface of each coupon and frictionally urges it toward the rear of the stacker assembly 62.

As most clearly illustrated in FIG. 5, the stacker assembly 62 includes a follower plate 71 which is mounted on the upper end of a vertically disposed support rod 72 which is mounted within the stacker for vertical movement therein. The lower end of the rod 72 has secured thereto one end of a clock spring 74 with the other end of the spring being rigidly secured to the frame of the perforating apparatus 44. Thus, it will be appreciated that the clock spring 74 serves to urge the support rod 72 and the follower 71 upwardly. As the coupons 30 are successively stacked within the stacker assembly 62, the follower plate 71 is urged downwardly against the bias of the clock spring 74.

In keeping with the present invention, means are provided for insuring a positive feed of each coupon 30 from the supply hopper 48, past the reading head 45 and to the stacker assembly 62. As best illustrated in FIGS. 5 and 6, a motor $M_R$ is securely mounted on the frame of the reading apparatus 44. The output shaft 75 of the motor is driving coupled with a drive shaft 76 journaled in the opposite side frames 78, 79 of the reading apparatus 44 by means of a toothed belt 80 passing over sprockets 81, 82 which are respectively mounted on the shafts 75, 76. In order to drivingly couple the motor $M_R$ with the various rotatable components of the reading apparatus 44, a driving sprocket 84 is rigidly secured to the end of the drive shaft 76 passing through the frame 78.

For insuring a slippable drive coupling to the reader drum 51, the drum shaft 56 has keyed thereon a clutch drum 85 which is frictionally driven by means of a torque disc 86 integral with a drive sprocket 88. The sprocket 88 is mounted on a bearing assembly 89 formed on the projecting end of the drum shaft 56. To insure a yieldable drive coupling, the sprocket 88 and the torque transmitting disc 86 are normally urged towards the clutch drum 85 by means of a spring 90 interposed between the bearing assembly 89 and a cap nut 91 threadingly coupled on the end of the drum shaft 56.

In order to provide means for driving the feed rolls 50, each is rigidly mounted on a shaft 92 (FIG. 9) journaled in support plates 94, 95 and a slippable drive coupling 96 is mounted on the end of the shaft 92. In the exemplary apparatus illustrated, the coupling 96 includes a continuously driven gear 98, a clutch disc 99 and a felt disc 100, with the felt disc interposed between the gear and the clutch disc. The clutch disc is here shown as integral with a collar 101 which is splined to the shaft 92, while the gear 98 is rotatably mounted on the shaft 92. For normally engaging the clutch 99 and the felt disc 100 with the driving gear 98, a spring 102 is interposed between the collar 101 and a second collar 104 rigidly mounted on the shaft. It will be appreciated that by proper adjustment of the axial position of the collar 104, the driving torque obtained by the coupling 96 can be regulated. To insure continuous rotation of the clutch gear 98, it is meshed with a drive gear 105 mounted on a stub shaft 106 which is journaled in the side frame 78. A sprocket 108 is drivingly mounted on the stub shaft 106 on the portion thereof projecting through the frame 78.

Referring next to FIGS. 5 and 6, it will be seen that the feed roll 70 for the stacker assembly 62 is rigidly mounted on a shaft 69 having a portion projecting through the side frame 78 of the reading apparatus 44 and on which is mounted a sprocket 109. A continuous toothed belt 110 is trained around the drive sprocket 84, the drum sprocket 88, the feed roll sprocket 108 and the stacker roll sprocket 109. The toothed belt 110 is further trained about an idler roll 111 which is adjustably mounted on the frame 78 of the reading apparatus. Thus, it will be seen that rotation of the drive shaft 76 and its drive sprocket 84 causes continuous rotation of the sprockets 88, 108 and 109, thereby providing a continuous drive for the stacker roll 70, the reader drum 51 and the feed roll 50. As most clearly indicated in FIG. 9, an idler mechanism, generally indicated at 107, is utilized to drive the start roll 49, the idler mechanism being driven from the slippable coupling 96.

Provision is also made for driving the endless belt 65 from the drive shaft 76. To this end, a gear 112 mounted on the opposite end of the drive shaft 76 from the sprocket 84 is meshed with a gear 114 mounted on a stub shaft 115. The shaft 115 is here journalled in the side frame 79. An endless belt 116 is trained about a pair of sprockets 118, 119, of which the former is keyed to the stub shaft 115 and the latter is drivingly mount- keyed to the stub shaft 115 and the latter driving mounted on a shaft 120 which is journalled in the side frames 78, 79. The shaft 120 supports and drives the sprocket 68 about which the belt 65 is trained.

Of course, it will be appreciated that the various rotatable components discussed above may be driven at any desired speeds relative to the motor speed merely by appropriate selection of the sprocket and gear diameters.

In accordance with one of the important aspects of the present invention, provision is made for inhibiting rotation of the reader drum 51 and for initiating rotation thereof in synchronism with a demand signal emanating from the row-by-row punching apparatus 206 (FIG. 24) utilized to process a record card 39. To this end, the clutch drum 85 which is keyed to the reader drum drive shaft 56, has formed therein a cam track 121 (FIG. 7). For normally inhibiting rotation of the drum 51, a lever 122, pivoted at 124 to the side frame 78 of the reading apparatus 44, carries an integral cam pin 125 which is normally urged into the cam track 121. A solenoid 126, having its armature 128 pivotally connected at 129 to the lever 122, is mounted on the side frame 78 for withdrawing the cam pin 125 from the cam track 121 when the solenoid is energized.

As will subsequently be described in greater detail, provision is made for supplying a short current pulse to the solenoid coil 126 each time that the indicia-applying apparatus is at a predetermined point in its punching cycle. When this occurs, the solenoid coil 126 is momentarily energized and the armature 128 is retracted, thus causing counterclockwise pivoting movement of the lever 122 (as viewed in FIG. 7) and disengagement of the cam pin 125 from the cam track 121. As the pin snaps out of its track, the clutch drum 85 is drivingly couple to the torque disc 86 and the sprocket 88, thus insuring one full rotation of the reader drum 51. Since the solenoid 126 is only momentarily energized, the cam pin 125 is again urged into contact with the surface of the clutch drum 85. Thus, the pin is again received within the cam track 121 upon completion of a single drum revolution, thereby again inhibiting rotation of the reader drum 51. For limiting the pivotal movement of the lever 122, its free end is loosely received within a bumper assembly 130 which is mounted on the side frame 78.

In accordance with another important aspect of the present invention, provision is made for positively feeding coupons 30 from the supply hopper 48 to the reader drum 51 one at a time, and for braking the feed mechanism whenever a coupon is in position for engagement with the teeth 52, 52a on the reader drum. To accomplish this, the stack 46 of coupons 30 is normally urged into engagement with the starting roll 49 and the feed rolls 50 by means of a stack follower 131 (FIG. 8). For urging the follower 131 into engagement with the stack 46 of coupons, the follower is slidably mounted on a longitudinally extending guide post 132 integral with the frame of the reading apparatus 44. The follower is urged into contact with the stack by means of a spring 134 which is secured at one end to the follower 131 and at the other end to the frame. Thus, with the stack 46 in engagement with the starting roll 49 and the feed rolls 50, the leading coupon is urged downwardly along an arcuate guide plate 135 disposed about the periphery of the feed rolls 50.

To insure that only one coupon 30 is in position to be picked up by the reader drum 51 each time that the drum is released for rotation, provision is made for braking the feed rolls 50 as a coupon 30 approaches the reader drum. To accomplish this, a suitable braking mechanism, for example, the exemplary electric brake 136 illustrated diagrammatically in FIG. 9, is utilized to overcome the frictional driving torque exerted on the shaft 92 by the slippable coupling 96. Such a brake may include an annular, channel-shaped stator 138 which is integral with the frame of the reading apparatus 44 and through which the shaft 92 extends. A collar 139 is keyed directly to the shaft 92 for rotation therewith and a brake rotor 140 is splined to the collar 139. Thus, the rotor is free for slight axial movement relative to the shaft 92, while at the same time being rotatably coupled thereto. A brake coil 141 is positioned within the channel-shaped stator 138. When the coil 141 is energized, the rotor 140 is drawn into intimate engagement with the stator 138, thus locking the rotor and stator together. The braking force imparted by the brake 136 serves to overcome the driving torque imparted by the friction clutch elements 98, 99 and 100 to the shaft 92.

In order to energize the brake coil 141 in response to the position of a coupon 30 being fed to the reader drum 51, thus inhibiting rotation of the feed rolls 50, a normally open switch LS1 (FIGS. 8 and 26) is included in the energizing circuit for the brake coil. As illustrated in FIG. 8, the switch LS1 is held normally open with its actuator LS1$_a$ depressed by means of a spring 142 which is secured at one end to the frame of the reading apparatus 44 and at its other end to an actuating lever 144 pivoted to the frame at 145. As each coupon 30 is fed towards the reader drum 51 by the feed rolls 50, it passes from the arcuate guide plate 135 to a coupon holding station defined by a pair of converging guide plates 146, 148. The leading edge of the coupon engages the actuating lever 144 for the switch LS1, thus effecting pivoted movement of the lever in a clockwise direction (as viewed in FIG. 8a) and freeing the switch actuator LS1$_a$, thereby closing the switch. Upon closure of the switch LS1, the energizing circuit for the brake coil 141 (FIG. 26) is completed and the rotor 140 (FIG. 9) is drawn into engagement with the stator 138. In this manner the shaft 92 and the feed rolls 50 are braked.

It will be appreciated that when the reader drum 51 is released, its teeth 52, 52a will register with the openings 31, 31a (FIG. 1) in the coupon located at the holding station and the coupon will be carried past the reading head 45. As soon as the coupon passes completely beneath the lever 144, the spring 142 will again urge the lever in a counterclockwise direction. The switch actuator LS1$_a$ is again depressed to open the switch, the brake 136 is de-energized, and the next coupon is fed to the holding station.

In order to remove a stack of coupons from the stacker assembly 62, provision is made for tilting the entire stacker assembly rearwardly relative to the frame of the reading apparatus 44. To accomplish this, the stacker assembly 62 is pivoted to the frame by means of a pin 149 which extends through, and is journaled in, a pair of spaced side plates 150, 151 (FIGS. 5 and 6) depending from the frame of the reading apparatus 44. For normally urging the stacker assembly 62 to a closed position, a spring 152 is rigidly secured at one end to the side plate 150 and at its other end to a lever 154, one end of which is integrally mounted in the pivot pin 149. When it is desired to swing the stacker assembly 62 to the open position, it is merely necessary to grasp the handle 155 and to move the stacker assembly rearwardly, thus effecting clockwise swinging movement of the stacker assembly (as viewed in FIG. 5) about the pivotal axis 149 and against the bias of the spring 152.

To hold the stacker assembly in the open position, a latch 156 is securely mounted on the side plate 150 and positioned to engage with a hook 158 carried by the stacker. The hook 158 is formed on one end of an L-shaped lever 159 which is pivoted at 160 to the stacker assembly 62. The other end of the lever 159 is pivotally coupled at 161 to the lower end of a connecting link 162, the upper end of which is pivoted at 164 to a latch release lever 165. The release lever is pivoted to the stacker assembly at 166. When it is desired to again close the stacker assembly, it is merely necessary to depress the end of the latch release lever 165, which, through the pivotal connections of the connecting link 162 and the L-shaped lever 159, effects counterclockwise movement of the lever 159, and disengagement of the hook 158 from the latch 156.

To retain the coupons 30 which had been read within the stacker assembly 62, a cover 168 is hinged intermediate its ends at 169 to the stacker assembly. The cover is provided with a rearwardly extending tab portion 170 and is bifurcated at its forward end to provide a pair of forwardly extending fingers 171, 172 (FIG. 6) which straddle the lower portion of the stacker feed roll 70. As more clearly illustrated in FIGS. 5 and 8, the forward ends of the fingers 171, 172 are curved upwardly, thus forming a guide which insures that each coupon is directed onto the stacker follower plate 71. For normally maintaining the cover 168 in a closed position, a spring 174 is secured at 175 to the stacker assembly 62 and at 176 to the cover. When the operator desires to remove coupons from the stacker 62, it is merely necessary to swing the assembly to an open position and to depress the rearwardly extending tab portion 170 of the cover, thus providing access to the coupons. The connection of the spring 174 to the cover 168 may be located so that the spring not only serves to hold the cover in a closed position, but it also serves to hold the cover in the open position after the tab portion 170 has been fully depressed. To insure that the cover 168 is returned to a closed position incident to closing of the stacker assembly, a rearwardly extending rod 178 is secured to the frame of the reading apparatus 44 and positioned to engage the tab portion 170 of the cover when the assembly 62 is returned to its closed position, thus pivoting the cover in a counterclockwise direction about the hinge 169 and allowing the spring 175 to snap the cover into closed position.

In order to facilitate a complete understanding of the present invention, an exemplary buffer storage system that can be used with the present invention is illustrated in FIGS. 11–23 and will be described in detail below.

For insuring that the serial reading apparatus 44 of the present invention can be operated in synchronism with, for example, a conventional row-by-row punching apparatus, provision is made for transmitting successive sets of output signals, produced by the photosensitive elements in the reading head, and representative of the character indicia appearing on a single coupon 30, to a buffer storage assembly 200 wherein the signals are sensed for both parity and coupon error, and wherein output signals are delivered to suitable punching apparatus in response to demands of the punch. Referring to FIG. 11, this is accomplished by transmitting the individual signals produced by the respective photocells in the reading head 45 to preamplifiers 201 where such signals are amplified and shaped. The output of each preamplifier is coupled with an input translator 202 which converts the in-line coded signals to binary form, the latter being more suitable for storage. The output of the input translator 202 is coupled with a distributor assembly 204 which delivers the binary coded signals in sequence to a plurality of memory translators 205, there being one such translator for each character on the coupon 30. The output of each memory translator is in turn coupled to a conventional row-by-row punching apparatus 206 (shown diagrammatically in FIGS. 11 and 24) through a punch inhibitor 208.

In order to prevent actuation of the punching apparatus 206 in the event that any reading error or irregularity is detected by the buffer storage assembly 200, a punch suppressor 209 is drivingly coupled with the inhibitor 208. For sensing that all of the character indicia on any one coupon has been read, the input to the punch suppressor 209 is connected to the output of a "word-length" detector 210 and to the output of a dark cell preamplifier 211 which receives a signal from the photocell PCD in the reading head 45 as the trailing edge of each coupon 30 passes. To sense whether or not the distributor has counted the proper number of legitimate characters, its output is coupled to the input of the word-length detector 210.

In order to prepare the reading apparatus 44 for translation of a new coupon past the reading head 45 so that signals responsive to character indicia present thereon can be delivered to the buffer storage assembly 200, a reader control assembly 212 is coupled with the punching apparatus 206 in such a manner that when the row-by-row punch has stepped through a predetermined number of rows, a start command is delivered to the reader drum release solenoid 126, thus initiating a read cycle and a feed cylce for the reading apparatus 44.

As illustrated in FIG. 11 the photocells PC1, PC2, PC4, PC7, and PCC are respectively connected to different ones of the preamplifiers and pulse shapers 201a–201e. A typical organization for one of these preamplifiers, e.g., preamplifier 201a, is illustrated in FIG. 12 wherein the photocell PC1 is of the variable resistance type, comprising material such as lead sulphide, normally having a relatively high resistance which is decreased when exposed to a light source. The photocell PC1 is connected as part of a potential dividing circuit across a direct voltage source, here illustrated as a collector supply of −12 volts potential and ground. In order to simplify the ensuing discussion, the power supply terminals for −12 v., ground, +1.5 v., and +3 v. will hereafter be referred to as terminals 213–216 respectively. When the photocell PC1 is subjected to light, i.e., when it senses a perforation at a registered station in the coupon, an increase in current flow in the emitter-base circuit of an input transistor 217 results. This transistor 217 is connected as a conventional emitter follower and supplies its output to a second emitter follower 218. The output of the emitter follower 218 is connected to a common emitter type amplifier 219 through an RC coupling network 220. In order to limit the amplitude of the signal sensed by the photocell PC1 to a value which prevents saturation of the preamplifier 201a, and in order to insure that the current delivered to the base 219b of the transistor 219 is maintained below a fixed value, a non-linear device, here shown as a diode 221, is coupled from the base 219b to the emitter 219e. The output of the transistor 219 is taken from the collector 219c and coupled to the base 222b of another common emitter amplifier stage 222 through an RC network 223. For providing further amplification of the signal, two more common emitter amplifier stages 224, 225, each of which is similar to the stage 222, are cascaded.

To insure that a uniform output pulse of proper amplitude and duration is transmitted from the preamplifier 201a independent of the amplitude and shape of the signal delivered by the photocell PC1, the output of the amplifying stage 225 triggers a monostable multivibrator 226, having two cross-coupled transistors. Each time that a pulse is received on the input terminal 226a, the monostable multivibrator produces an output pulse of predetermined magnitude and duration on the terminal 227.

The output terminal 227 of the monostable multivibrator 226 is coupled to a power amplifier stage 228 which provides sufficient power to drive the input translator 202 (FIG. 11). For this purpose, the collector 228c of the amplifier 228 is coupled to the input terminal 229 of the input translator 202 through an amplifying and phase inverting device 230.

Referring to FIG. 13, the various components in the input translator 202 have been illustrated, partially in block-and-line form, to facilitate an understanding of the processing of the output signals from each of the preamplifiers 201a–201e. To compensate for skewing of the coupon 30 and resultant misalinement of the perforations representative of a particular character with the photocells, provision is made for storing the output signals from the preamplifiers 201a–201e until all of the perforations representative of the particular character have passed the light transmitting apertures 60 (FIG. 10) in the reading head 45. To this end, the output terminals 229a–229e of the preamplifiers 201a–201e are directly coupled to input memory units 231a–231e respectively, which may take the form of bi-state devices such as Eccles-Jordan "flip-flop" circuits or bi-stable multivibrators. Each such bi-state device is "set" to one state in response to an input signal from the associated preamplifier, and all are subsequently driven toward the other state, so that those previously "set" are reset. The output terminals 232a–232e of the input memory units are directly connected with input leads for a translator device or matrix 233, there being five such input leads, $L_1$, $L_2$, $L_4$, $L_7$ and $L_c$, respectively corersponding to the levels $L_1$, $L_2$, $L_4$, $L_7$ and $L_c$ of the code ilustrated in FIG. 2. The translator 233 includes ten output conductors 234, each corresponding to a different particular character "0" through "9," respectively. It will be readily apparent upon inspection of FIG. 13 that the translator inputs leads $L_1$–$L_c$ are electrically connected to different combinations of the output conductors 234 by a plurality of resistance elements R in accordance with the exemplary code system illustrated in FIG. 2. Thus, energization of different pairs of input leads to the translator 233 causes an output signal to be produced on a particular one of the output conductors 234 in accordance with the particular character sensed by the reading head 45.

In order to convert the output signals of the translator 233, which signals are representative of characters in a decimal code, to signals representative of corresponding characters in a binary code, a second translator unit or matrix 235 is provided having ten input conductors which are common with the output conductors 234 from the translator 233 and which are coupled thereto by an amplifying and phase inverting device 236a–236j, respectively. The translator 235 is here shown as a decimal-to-binary conversion diode matrix having four output lines L–1, L–2, L–4, and L–8, which respectively correspond to the levels L–1, L–2, L–4, and L–8 in the exemplary binary code illustrated in FIG. 3. It will be readily apparent upon inspection of FIG. 13 that the input conductors 234 to the translator 235 are electrically connected to different combinations of the output lines L–1 through L–8 by a plurality of asymmetrically conducting devices, here shown as diodes 237, in such a manner that a signal appearing on any one of the input conductors will cause simultaneous output signals on different combinations of the output lines, which output signals are uniquely representative of the particular character read by the reading head 45. The output lines L–1 through L–8 are electrically coupled to each of the memory translators 205 through an enable generator 238.

For insuring that the output signals from the binary translator 235 will be delivered to a particular memory translator 205 only when the entire character has been read into the input memory units 231, the enable generator 238 is coupled to each of the memory unit input terminals 229a–229e through an "or" gate 239 (FIG. 13). So long as the "or" gate 239 receives at least one input signal, its output voltage is relatively high, but when all input signals disappear, there is a negative-going voltage change in the output signal P6 signifying that all perforations for a given character have been read. This actuates the generator 238.

In order to insure that each of the memory units 231 are cleared preparatory to reception of signals representative of the next successive character being read by the reading head, an output terminal of the enable generator 238 is electrically connected to trigger an input memory reset generator 240 which is coupled to the reset terminals 241a–241e of the input memory unit 231a–231e, respectively.

To make certain that the output of the distributor assembly 204 (FIG. 11) is applied successively to the memory translators 205, but only when a valid character is read into the buffer storage assembly 200, provision is made for sensing whether or not the output signals from the translator 233 are representative of one of the several particular valid characters, and for inhibiting the distributor drive when the signals are not representative of valid characters. To this end, the distributor 204 is driven by a distributor drive mechanism 242 which is coupled on the output side of the enable generator 238 to each of the output translator lines L–1 through L–8 (FIG. 15). A distributor drive inhibitor 243 is interposed between distributor drive 242 and the distributor 204 and is also coupled to the output of an invalid character detector 244 having ten input terminals 234a–234j which are common with the output terminals of the translator 233.

It will be immediately apparent by reference to the exemplary code system illustrated in FIG. 2 that each particular character is represented by different combinations of two, and two only, perforations. Thus, should the coupon 30 being read by improperly punched so that other than two perforations appear for any one character, signals would appear on some number, other than one, of the output lines 234 from the translator 233. For example, should the particular character being read have only one perforation, there would be no output signal at all from the translator 233 and the distributor assembly 204 would remain static. On the other hand, should three or more perforations be present in the particular character being read, an output signal would appear on two or more of the output lines 234 from the translator 233 and the invalid character detector 244 would signal the distributor drive inhibitor 243 that an invalid character had been detected. In those instances where a valid character is detected by the detector 244, i.e., when one and only one output line 234 has a signal appearing thereon, the distributor drive inhibitor 243 is informed that a valid character has been sensed and it therefore allows the distributor drive 242 to step the distributor 204 to the next successive memory translator 205.

Referring now to FIG. 14, there is illustrated a typical input memory unit 231 which, in the exemplary form of the invention, may be a bistate device such as a bistable multivibrator or flip-flop. As here shown, each input memory unit 231 includes a pair of common emitter amplifiers 245, 246 with each amplifier output directly coupled with the other amplifier input. Each of the amplifiers is connected across power supply terminals 213, 215 which may be, for example, maintained at voltages of —12 v. and +1.5 v., respectively, relative to ground. Each time a signal in the form of a negative pulse P–1 is received on the termial 229 associated with one of the preamplifiers 201, the bistable multivibrator will be triggered so that the amplifier 246 is turned on and the amplifier 245 is turned off, thus producing a positive-going change in the voltage level of the output terminal 232 and sending a command signal in the form of a positive potential level P–2 to the translator 233. Each time that the enable generator 238 (FIG. 13) is triggered, a command signal in the form of a positive pulse P–10 is delivered to the reset generator 240, thereby producing a negative input pulse P–11 at the terminal 241 of the bistable multivibrator. Each input signal impressed upon the terminal 241 again triggers the bistable multivibrator and turns the amplifier 246 off and the amplifier 245 on, thus preparing the memory unit 231 for reception of the next input signal.

FIG. 15 shows one organization of components for the enabling generator 238. In the exemplary form here shown, the matrix output lines L–1, L–2, L–4, and L–8̄ from the translator 235 are respectively coupled to the bases 249b, 250b, 251b, and 252b of a plurality of gated common emitter amplifiers 249–252. In order to provide an output signal for driving the distributor assembly 204 (FIG. 11), the collectors 249c–252c are, respectively, connected to output terminals 253a–253d. The emitters 249e–252e of the amplifiers are each coupled to the collector 254c of a gating transistor 254. The gating transistor emitter 254e is connected to the power supply terminal 215 (+1.5 v.), while the gating transistor base 254b is connected to the output terminal 255 of a monostable multivibrator, generally indicated at 256.

For allowing an output signal to be transmitted from the translator 235 (FIG. 13) to the memory translators 205, provision is made for generating a gating signal of predetermined duration and amplitude. Such apparatus may conveniently take the form of a monostable device, such as the multivibrator 256, having a pair of common emitter amplifiers 258, 259 connected across the power supply terminals 213 (−12 v.) and 215 (+1.5 v.). As illustrated in FIG. 15, the collector 258c of the amplifier 258 is directly connected to both the base 259b of the amplifier 259 and the output terminal 255, while the collector 259c of the amplifier 259 is coupled to the base 258b of the amplifier 258 through a capacitor C1. Thus, the monostable multivibrator 256 has one stable state, i.e., with the amplifier 258 on, and one quasi-stable state, i.e., with the amplifier 259 on. To trigger the monostable multivibrator device 256 in its quasi-stable state, the base 259b of the normally cut off amplifier 259 is coupled to the output terminal 260 of the "or" gate 239 through a capacitor C2. Each negative-going pulse P–7 applied to the base 259b as a result of differentiation of the pulse P–6 by the capacitor C2, turns the multivibrator "on" so that output terminal 255 is dropped in potential (pulse P–8) for a predetermined period. Moreover, each time that the monostable multivibrator 256 switches to its "on" state the input terminal 261 rises abruptly in potential, so that a resetting pulse P–10 is supplied to the reset generator 240.

For transmitting an output signal from three or less of the gated amplifiers 249–252 at a time determined by the monostable device 256 the gated amplifier collectors 249e–252c are, respectively, coupled to common emitter amplifiers 262–265. The amplifiers 262–265 have their bases 262b–265b connected to power supply terminal 216 (+3 v.), their emitters 262e–265e connected to the power supply terminal 215 (+1.5 v.) and their collectors 262c–265c connected through load resistors to the power supply terminal 213 (−12 v.). The collectors 262c–265c are also respectively connected to output terminals 266a–266d.

To generate a command signal which serves to clear or reset the input memories 231 each time that the enable generator 238 passes information out of the translator 235, the output terminal 261 (FIG. 15) of the monostable device 256 in the enable generator is directly connected to a similar monostable device 267 which serves as the reset generator 240 (FIG. 16). The output of the monostable device 267 is directly connected to the input termials 241a–241e on each of the input memories 231. Thus, it will be appreciated that each time the monostable device 256 (FIG. 15) returns to its stable state condition (i.e., at the end of the pulse P–8 in FIG. 15), the trailing edge P–10a of the positive-going pulse P–10 applied to the terminal 261 drives the reset generator moonstable device 267 (FIG. 16) to its quasi-stable state condition. In this manner a command signal in the form of a negative-going pulse P–11 is impressed upon the input terminals 241a–241e of the input memory units 231 to cause the bistate devices therein (FIG. 14) all to return to (or remain in) their original states with the amplifier 245 on and the amplifier 246 off. Thus, each of the input memory units 231 is cleared for reception of the next input signal from the preamplifiers 201.

The details of the "or" gate 239 (FIG. 13) are shown in FIG. 17. For triggering the enable generator 238 each time that a character has been completely read into the buffer storage assembly 200, provision is made for driving the monostable multivibrator 256 (FIG. 15) to its quasi-stable state condition at the termination of the last signal output pulse generated by the preamplifiers 201. In order to accomplish this a negative pulse P–1 appearing on any of the input terminals 229 of the input memory units 231 is conducted through nonlinear unilateral devices, here shown as diodes 268a–268e (FIG. 17) to the base 269e of a common emitter amplifier 269, which in its normal state is cut off. Conduction by any one of these diodes produces at the collector 269c of the amplifier 269 a positive-going pulse P–6 which is impressed upon the terminal 260, the terminal 260 being the input terminal to the enable generator monostable device 256 (FIG. 15) as previously described. Thus, each time that a character has been completely read into the buffer storage assembly 200, the amplifier 269 will return to its normal nonconducting state and the trailing edge of the positive-going pulse P–6, will, by the differentiating action of the capacitor C2 (FIG. 15), produce a negative pulse P–7 which triggers the monostable multivibrator 256. The negative output pulse P–8 generated by the monostable device 256 is impressed upon the base 254b of the gating transistor 254 and its positive output pulse P–9 renders the amplifiers 249–252 conductive and impresses a negative pulse P–5 on three or less of the output terminals 255 in accordance with the output signals derived from the translator 235.

Referring to FIG. 18, there is illustrated a typical organization of the distributor drive and distributor drive inhibiting mechanism which have been previously shown in block form in FIG.13. In the exemplary form of the invention, the distributor drive 242 provides a command signal for driving the distributor mechanism 204 each time that information is passed out of the enable generator 238 (FIG. 13). However, each time that the detector 244 senses the presence of an invalid character, a command signal is delivered to the distributor drive inhibitor 243. In operation, the outputs of both the invalid character detector 244 and the distributor drive 242 are combined in the inhibitor 243 in such manner that whenever an output signal is delivered from the invalid character detector it combines with the drive signal to inhibit the driving command to the distributor. Whenever the invalid character detector 244 senses the presence of a valid character it delivers no output signal to the inhibitor and the output signal from the distributor drive 242 serves to drive the distributor 204.

In order to generate a drive signal in the distributor drive 242, output terminals 253a–253d (FIGS. 15 and 18) in the enable generator 238 are all coupled to the base 270b of a common emitter amplifier 270 through unilaterally conductive devices, here shown as diodes 271a–271d. The amplifier emitter 270e is electrically connected to the power supply terminal 214 while the collector 270c is connected through a load resistor to the power supply terminal 213 and coupled directly to the input terminal 272 of the distributor drive inhibitor 243. The input terminal 272 of the distributor drive inhibitor 243 is directly coupled through a resistor to the base 274b of a common emitter amplifier 274 having its collector 274c coupled to the distributor 204 (terminal 275Y) through a capacitor C3. The amplifier emitter 274e is coupled to a second distributor drive input terminal 276 (which is maintained at ground potential when the coupon is being read) for a purpose to be subsequently described in greater detail. Normally the appearance of a positive pulse P–4 on one or more of the distributor drive input terminals 253a–d will create a negative-going pulse P–12 on the distributor drive inhibitor input terminal 272. The output at the inhibitor collector 274c is, therefore, a positive-going pulse P13, the trailing edge of which produces a negative-going pulse P13a on the output terminal 275Y. This negative-going pulse P13a is utilized to drive the distributor mechanism 204.

The invalid character detector 244 is also shown in detail by FIG. 18. For inhibiting the distributor drive whenever an invalid character is read into the buffer storage assembly 200, the output terminals 234a–234j of the translator 233 (FIG. 13) are respectively coupled to the base 278b (FIG. 18) of a common emitter amplifier 278 in the invalid character detector 244 through unilaterally conductive devices, here shown as diodes 279a–279j. It will be recalled that a valid character is one having two perforations and when a valid character is read into the buffer assembly, one and only one of the translator output terminals 234a–234j will have a signal impressed thereon. However, if the presence of other than two perforations is sensed (for example, three, four, or five perforations), at least two of the translator output terminals 234 will have a signal impressed thereon. With only one perforation present in the coupon being read, no output signal will be delivered from the translator 233 at all. In this latter instance, there will be no input signal to the enable generator 238 and the distributor 204 will not be stepped.

A plurality of current determining resistors $R_a$–$R_j$ (FIG. 18) are respectively connected in series with the diodes 279a–279j, the value of each of these resistors being equal and selected such that a negative pulse P–3 impressed on only one input terminal will not result in sufficient current flow to turn the amplifier 278 on. However, if two or more output terminals are energized (i.e., when an invalid character is sensed), sufficient current flows to the base 278b to render the transistor 278 conductive, and the output of the amplifier at the collector 278c has developed thereon a positive pulse P–14 which is transmitted to the input terminals 272 of the distributor drive inhibitor 243. In such an instance the positive output pulse P–14 delivered from the invalid character detector 244 and the negative output pulse P–12 delivered from the distributor drive 242 are simultaneously impressed upon the input terminal 272 and serve to cancel one another, thus rendering the amplifier 274 nonconductive and preventing the transfer of the pulse P–12 to the terminal 275Y.

While it will be appreciated that the present invention is suitable for use in serially reading any number of characters on a given document and for storing the coded information for each character in a separate memory unit, it has been here illustrated and described in connection with a document having any number of individual characters up to and including thirty-one characters. To this end, the buffer storage assembly 200 includes thirty-one identical memory translators 205 (FIGS. 11, 13). In order that the first, second, third, and succeeding characters read by the reading head 45 can be stored in the first, second, third and succeeding ones of the memory translator 205, the distributor 204 includes a pair of identical distributor mechanism 280Y and 280X (FIG. 11), the former being shown in detail by FIGS. 20a and 20b. For convenience in understanding how the successive characters are routed to successive ones of the memory translators 205, those thirty-one memory translators may be visualized as physically located in a rectangular array (FIG. 19) having X and Y coordinates. A combination of an X coordinate number and a Y coordinate number thus corresponds to a particular one of the translators 205. For example, the coordinates or addresses Y–2, X–6 designate the eighth or number 8 translator 205 which is to receive and store the eighth character read from a coupon or document 30. To route information into the proper memory translator 205, the distributor counts the number of characters read, and switches a transfer connection successively to the thirty-one translators. For properly addressing each of the memory translators 205, the distributor mechanisms 280Y, 280X are each triggered in accordance with a predetermined address code. An example of a typical code that might be used for addressing the memory translators 205 is illustrated in FIG. 19. The state or stored count of the distributor mechanism 280X is represented by the X coordinate and the state or stored count of the distributor mechanism 280Y is represented by the Y coordinate.

As illustrated in FIG. 19 and as will be described with greater particularity below, the distributor mechanisms 280–Y, 280–X initially preset to states Y–1, X–O so that the first character is routed to the number one memory translator 205. Each of the input signals to the distributor drive 204 from the distributor drive 242 is transmitted directly to the mechanism 280–Y associated with the Y-axis and each successive input signal serves to step the mechanism 280–Y successively through states or counts Y–1 to Y–6, while the mechanism 280–X remains stationary at state X–O. It will be appreciated therefore that the first five input signals will serve to step the distributor 280–Y from states Y–1 to Y–6, and information will be sequentially stored in the first five memory translators 205. The sixth successive input signal to the distributor 280–Y will then cause information to be stored in the sixth memory translator and will thereafter step the distributor 280–Y back to state Y–1. Simultaneously, a driving pulse is transmitted from the distributor 280–Y to the distributor 280–X to step the latter from state X–O to state X–6, thus preparing an entry path into the seventh memory translator 205 for the seventh character on the coupon 30 being read. The distributor 280–X will then remain in its X–1 state while the distributor 280–X again steps successively through its six states. The foregoing cycle is repeated until the information being read from the tag has been successively stored in each of the thirty-one memory translators 205, respectively, corresponding to the thirty-one characters being read from the coupon 30.

Referring to FIGS. 20a, 20b, there is illustrated a typical organization of one of the distributor mechanisms, unit 280–Y, and which is identical to the distributor 280–X. These two units successively, establish entry paths to the memory translators 205 so as to sequentially prepare each unit for acceptance of the coded signals representing thirty-one successive characters. The distributor 280–X (not shown in detail) is identical in all respects to the distributor 280–Y, with the single exception that the input signal for triggering the distributor 280–X is derived from the distributor 280–Y rather than from the distributor drive 242. Each distributor mechanism includes a counter drive 281 (FIG. 20a), a counting device 282 (FIG. 20b), and a reset mechanism 284 (FIG. 20a) for returning both the counter drive and the counting device to their starting states. For progressively channeling the coded information to the proper memory translator 205, the counter drive 281 includes a common emitter amplifier 285 (FIG. 20a), having its base 285b coupled to the output terminal 275–Y of the distributor drive inhibitor 243 through a capacitor C4. The amplifier collector 285c transmits a negative-going pulse P–15 for each character read by the reading head 45 to a scaler unit 286, here shown as a bistable device, for example, a bistable multivibrator having a pair of cross-coupled common emitter amplifiers 288, 289 and a pair of steering diodes 290, 291, respectively, connected in their input circuits. For selectively triggering the amplifiers 288, 289, the latter are connected to the collector 295c through coupling capacitors C5, C6, respectively. When a negative pulse P-15 is transmitted to the scaler 286, and assuming that the scaler is preconditioned with the amplifier 288 non-conductive and the amplifier 289 conductive, the coupling capacitor C6 will be charged to a greater degree than the capacitor C5. Upon termination of the input signal P-15 from the amplifier 285, the coupling capacitor C6 discharges through the steering diode 291 to create a positive input pulse P-16 at the base 289b, thereby rendering the amplifier 289 non-conductive. The negative output pulse P-17 appearing at the collector 289c as a result of this is coupled to the base 288d of the amplifier 288 through an R-C network 292, thus turning the amplifier 288 on. Thus, as a result of the switching action, a positive output pulse P-18 is created at the collector 288c which is coupled to the base 289b of the amplifier 289 through an R-C network 294 and which serves to maintain the amplifier 289 in the off state. The positive output pulse P-18 from the amplifier 288 is also transmitted to the base 295b of a normally conducting, emitter amplifier 295 through an R-C network 296. It will be understood that if the scaler 286 were previously in that state with the amplifier 289 off and the amplifier 288 on, the input pulse P-15 from the amplifier 285 would serve to reverse the states of the amplifiers 288, 289, thus creating a positive-going output pulse at the collector 289c. In this event, a positive pulse P-19 would be impressed upon the base 298b, of normally conducting amplifier 298, through R-C network 297.

For causing the counting device 282 (FIG. 20b) to switch sequentially through its six states (there being one such state corresponding to each level in the Y-axis illustrated in FIG. 19) so as to sequentially condition the output terminals Y-1 through Y-6 at a negative level of potential, the amplifiers 295 and 298 (FIG. 20a) are coupled to a plurality of bistate holding devices 299-304 (FIG. 20b) which are here shown as bistable multivibrators. It will be apparent from inspection of FIG. 20b that the holding devices 299-304 have respective output terminals Y-1 through Y-6 which correspond to the levels in the Y-axis of the address code illustrated in FIG. 19. The collector 295c of the amplifier 295 is coupled through terminal T1 to the base of one amplifier in each of the holding devices 299, 301 and 303, while the collector 298c of the amplifier 298 is, respectively, coupled through terminal T2 to the bases of one amplifier in each of the holding devices 300, 302 and 304. Thus, a negative output pulse P-20 from the amplifier 295 is transmitted to counting levels Y-1, Y-3 and Y-5, while a similar negative output pulse P-21 from the amplifier 298 is transmitted to counting levels Y-2, Y-4 and Y-6.

Each of the holding devices 299-304 may occupy one of two states, here identified as the "select" and "non-select" states. In keeping with the present invention, the holding devices are so intercoupled that only one can occupy the "select" state at a time, while all other holding devices are conditioned in the "non-select" state. Moreover, the "select" state is designated as that in which the transistor leading to one of the output terminals Y-1 through Y-6 is cut off, placing that output terminal at a negative level of potential P-22.

In order to simplify the ensuing discussion, it will be understood that the operation of each of the holding devices 299-304 is essentially the same. Therefore, a description of the holding device 299 and its operation will suffice for each of the remaining holding devices.

In the illustrative form of the invention, each holding device is formed as a two-transistor, bistable multivibrator having a pair of cross-coupled common emitter amplifiers. Thus, the holding device 299 is shown as having a pair of common emitter amplifiers 305 and 306 with the base 305b of the amplifier 305 being directly coupled through terminal T1 to the collector 295c (FIG. 20a) of the amplifier 295. It will be understood that the bases of corresponding amplifiers in holding devices 301 and 303 are also directly coupled to the collector 295c and the bases of corresponding amplifiers in holding devices 300, 302 and 304 are coupled through terminal T2 to the collector 298c. Moreover, when the holding device 299 is in the "select" state, i.e., when the amplifier 305 is "off," each of the other holding devices 300-304 are in the "non-select" state, i.e., the amplifier in each holding device corresponding to the amplifier 305 is in the "on" condition. At this time, the output terminal Y-1 is at a negative level of potential (P-22) while all other output terminals are at a positive level. When a positive input pulse P-18 is transmitted to the base 295b of the amplifier 295 in the counter drive 281, a negative output pulse P-20 is passed from the collector 295c directly to the base 305b of the amplifier 305 in the holding device 299. This negative pulse is also conducted directly to the bases of the amplifiers in the holding devices 301 and 303 corresponding to the amplifier 305, but since only the holding device 299 is in the "select" state, the pulse will have no effect upon the holding devices 301 or 303. The negative pulse P-20, impressed upon the base 305b of the amplifier 305 serves to turn the amplifier 305 "on" and the amplifier 306 "off," as is characteristic of bistable devices of the type illustrated. Thus, the positive output pulse P-23, taken from the collector 305c of the amplifier 305, is transmitted directly to the base 306b of the amplifier 306, turning the latter off. The collector 306c of the amplifier 306 is directly coupled to the base 308b of a common emitter amplifier 308, having its collector 308c electrically connected to the Y-distributor output terminal Y-1. Thus, when the holding device 299 is in its "select" state (the Y-1 terminal at a negative level of potential P-22) and a negative input pulse P-20 is sensed at the base 305b, there is a transition period during which the holding device 299 switches from the "select" state to the "non-select" state. During this transition period a negative output pulse P-24 is transmitted from the collector 306c of the amplifier 306 to the base 308b of the amplifier 308, which pulse creates a positive level of potential P-25 at the collector 308c and therefore a positive level of potential at the output terminal Y-1.

Since all "non-select" Y-distributor output terminals, e.g., terminals Y-2 through Y-6, are maintained at a positive level of potential, the negative level of potential P-22 present at the terminal Y-1 serves as a command signal to each of the memories associated with the Y-1 output terminal, (i.e., character positions "1," "7," "13," "19," "25" and "31," as shown in FIG. 19). When the terminal Y-1 goes positive, the command signal terminates, and the next Y-distributor output terminal Y-2 enters the "select" state.

For preparing the holding device 300 and switching it from the "non-select" to the "select" state in readiness for the next input signal which will be transmitted from the amplifier 298, provision is made for reversing the state of the bistable device in the holding device 300. To this end, the collector 306c in the holding device 299 is coupled to the base 309b of a transistor 309 through an R-C network 310, it being understood that the amplifier 309 is "off" when the holding device is in the "non-select" state. Thus, during the transition period when the holding device 299 is switching from the "select" to the "non-select" state, the negative pulse P-24 is also transmitted from the collector 306c through the R-C network 310 to the base 309b of amplifier 309, thereby turning the amplifier 309 on and turning the other amplifier 311 off. The holding device 300 is now in the "select" state while all other holding devices of the Y-distributor are in the "non-select" state. Thus, the next input signal P-13a impressed upon the distributor input terminal 275-Y will effect, through the scaler 286, a negative output pulse P-21 at the collector 298c of the amplifier 298 and, in turn, a negative input signal at the base 311b of the amplifier 311. In this manner the amplifier 311, which was "off," is turned "on" and the amplifier 309 is is turned "off," resulting in a negative input pulse P–26 to the base 312b of the amplifier 312. Since the collector 312c is coupled to the distributor output terminal Y–2, which terminal is at a negative level of potential P–22 when in the "select" state, the positive output signal P–27 of the amplifier 312 serves to drive the potential level of the output terminal Y–2 positive, thus terminating the command signal created by the negative potential P–22. During the transition period when the holding device 300 is moving from the "select" state to the "non-select" state, the negative output pulse P–26 is also transmitted from the collector 309c over R–C network 313 to the bistable device associated with the holding device 301, thus turning the holding device 301 to the "select" state in readiness for the next input signal from the counter drive 281.

It will be understood that during each of the foregoing steps of the distributor 280Y, the distributor 280X (not shown) remains at X–O state, and an X–O output terminal (not shown) will be at a negative potential level. In a manner to be described, the only memory translator 205 which is receptive to store an incoming character-representing signal is that one which receives a negative potential from both distributors 280Y and 280X. That particular memory translator is enabled for reception and storage of the binary coded output from the enable generator 238. Thus, as the first six characters are read by the head 45, coded binary signals will be sent successively into the first six translators 205 (FIG. 19) which all have an X–O address and addresses Y–1 through Y–6, respectively.

After the sixth character has been read and stored in the sixth translator 205, the holding device 304 is switched from a "select" to a "non-select" state, and its output terminal Y–6, which is at a negative level of potential P–22 when in the "select" state, is returned to a positive level of potential P–28. The bistable device associated with the holding device 304 is coupled through an R–C network 314 to the bistable device associated with the holding device 299, thus serving to return the holding device 299 to the "select" state when the holding device 304 switches to the "non-select" state. The negative level of potential P–22 present at the terminal Y–6 when the device 304 is in the "select" state is transmitted through an inverter-amplifier 315 to the input terminal 275X of the second distributor unit 280X, where it appears as a positive voltage level P–29. When the device 304 resets to the "non-select" state the voltage at terminal 275X drops in potential to create a negative-going input pulse to the distributor unit 280X. This produces in the unit 280X the same operation previously described for the unit 280Y in response to the input pulse P13a. Thus, each time that the Y-distributor steps through all of its six states, and each time that the potential on terminal Y–6 restores to a positive level, the X-distributor is stepped to its next state. The thirty-one address codes Y1, XO through Y1, G30 shown in FIG. 19 are thus created in sequence by negative potentials appearing on different pairs of output terminals at the two distributor units.

To process the next tag having coded indicia formed thereon, provision is made for simultaneously clearing all of the memory translators 205 and for resetting the X and Y distributors to their initial states. To accomplish this, and as will be subsequently described in greater detail, a reset signal is generated upon completion of each punching operation by the punching apparatus 206 associated with the buffer storage system 200. When a reset signal is generated for the distributors, it is impressed upon the input terminal 316 (FIG. 20a) of the reset mechanism 284. The input terminal 316 is coupled to the base 318b of a common emitter amplifier 318 having its collector 318c directly coupled to the base 319b of a normally conductive common emitter amplifier 319 through capacitors C7 and C8. The normally conducting amplifier 319 is here shown as part of a monostable device 320 having a normally non-conducting common emitter amplifier 321. Each time that a negative reset signal P–30 is impressed upon the input terminal 316, a positive pulse P–31 is transmitted to the base 319b, thus serving to turn the amplifier 319 off and the amplifier 321 on.

For simultaneously resetting all of the holding devices 299–304 and the scaler 286, the collector 321c of the amplifier 321 is coupled to the base 322b of a normally conducting common emitter amplifier 322 through an R–C network 324. Each time that a positive pulse P–33 is impressed upon the base of the amplifier 322, the amplifier is turned off, thus creating a negative-going output pulse P–34 at its collector 322c. The collector 322c of the amplifier 322 is directly coupled to the base 289b of the scaler amplifier 289. The collector 322c is also directly coupled with the emitters 295e and 298e of the amplifiers 295 and 298 which, in turn, control the potential on terminals T1 and T2 connected to the holding devices 299–304. Thus, when a positive pulse P–33 is impressed upon the amplifier base 322b, and the transistor 322 reduced in conductivity, the negative voltage swing P–34 at its collector causes the transistor 289 to be switched "on," thereby setting the bistable circuit 286 in its original state. Simultaneously, the pulse P–34 makes both the amplifying transistors 295 and 298 conductive, so that both terminals T1 and T2 swing to a negative potential level P–34, thereby setting all of the holding devices 300–304 (FIG. 20b) to the "non-select" state.

In order to reset the holding device 299 (FIG. 20b) in its initial or starting "select" state, provision is made for turning the amplifier 305 off and the associated amplifier 306 on shortly after the above-described resetting action. To this end, the collector 319c (FIG. 20c) of the amplifier 319 in the monostable device 320 is coupled to the base 325b of a common emitter amplifier 325 through an R–C network 326. The collector 325c of the amplifier 325 is coupled through terminal T3 with the emitter 305e of the amplifier 305 in the holding device 299. When the monostable device 320 returns, after a predetermined period, to its normally stable state with the amplifier 319 on, the positive going trailing edge P–35 of the negative output pulse P–32 on the collector 319c is impressed upon the base 325b of the amplifier 325, thus creating a negative command signal P–36 at the terminal T3. This turns the amplifier 305 (FIG. 20b) "off" and the amplifier 306 "on." The holding device 299 is now in a "select" state with its output terminal Y–1 at a negative level P–22 of potential. Since the corresponding holding device in the distributor mechanism 280X is simultaneously reset, the distributor 204 is preconditioned for reception of a command signal representing the first character read from the next succeeding coupon.

In keeping with the invention, provision is made for sequentially receiving binary coded information representative of a plurality of successive characters and for storing the binary coded information for each character in a particular one of a plurality of memory translators 205. As here shown, the output terminals 266a–266d, of the enable generator 238 (FIG. 15) are coupled to each at thirty-one memory translators 205 through thirty-one sets of "and" gates. One such set of "and" gates for one memory translator are shown at 328a–328d in FIG. 21, each having three input lines. All those input lines must swing negative in potential to produce a negative voltage change on the single output line of a given "and" gate.

Referring to FIG. 22, one of the "and" gates 328a–328d in FIG. 21 is there shown in detail. It comprises three input terminals 266, X–O and Y–1 (the latter two terminals corresponding to the number one translator 205 (1) shown in FIG. 19), each of which is coupled to a single output terminal 329 through a unilaterally conductive device 348. It will be understood that the input terminal 266 corresponds to a particular one of the output terminals 266a–266d in the enable generator 238, while the X–O and Y–1 input terminals are respectively coupled to the output terminals in the X and Y distributors. The arrangement of the circuit is such that a negative output pulse P–37 is impressed upon the output terminal 329 if and only when negative input potentials P–5, P–22 and P–22 are, respectively, impressed upon each of the input terminals 266, X–O and Y–1 simultaneously.

Referring to FIG. 21, there is illustrated a typical translator 205, e.g., the translator 205 (1) associated with the first character position. For insuring that the coded information is sequentially stored in the proper memory translator 205, the "and" gates 328a–328d associated with each translator all have two of their input lines connected to the proper address output terminals of the X and Y distributors in accordance with the address code illustrated in FIG. 19. For example, the memory translator "and" gates 328a–328d associated with character positions "1" through "6" are, respectively, coupled to the output terminals Y–1 through Y–6 of the distributor 280–Y and are all coupled to the output terminal X–O of the distributor 280–X. Similarly, the "and" gates 328a–328d associated with the memory translators for character positions "7" through "12," inclusive, are, respectively, coupled to the output terminals Y–1 through Y–6 of the distributor 280–Y and to the output terminal X–6 of the distributor 280–X. Since the particular translator 205 shown in FIG. 21 is intended to receive signals resulting from the first character read from any coupon, its "and" gates 328a–328d all have two input lines connected to terminals Y–1 and X–O.

For storing the binary coded information transmitted from the translator 235 (FIG. 13) in particular memory translators 205, the output terminals 329a–329b of the "and" gates 328a–328d are coupled to memory devices 330a–330d, respectively. Such memory devices may simply take the form of bistable devices, e.g., transistor "flip-flop" circuits, identical in arrangement to the input memory units 231 illustrated in FIG. 14.

Each of the memory devices 330a–330d has two output terminals (334a–334d and 332a–332d) which normally reside at relatively high and low potentials when the device is in its "reset" state. A negative pulse applied to any input terminal 329a–329d switches the corresponding one of the devices 330a–330d to its "set" state, thus placing its upper and lower output terminals (e.g., potentials P–38 and P–39 on terminals 394a and 332a) at relatively low and high potentials, respectively. Any memory device 330a–330d which has been "set," may be reset by a negative pulse applied to its "reset" terminal 331a–331d, thus restoring the potentials on its output terminals to their original levels. The four pairs of output terminals 334a–334d and 332a–332d are connected to the eight input lines 336a–336d and 335a–335d of a binary-to-decimal translator 338, here shown as a resistor matrix.

The translator 338 has ten output leads 339a–339j, there being one output lead corresponding to each of the decimal characters "0" through "9." It will be readily apparent upon inspection of FIG. 21 that the translator input leads 335a–335d and 336a–336d are, respectively, coupled to different combinations of the output leads 339a–339j by a plurality of resistance elements 340 so arranged that different combinations of input signals P–5 impressed upon the terminals 266a–266d cause current flow in particular combinations of the resistance elements 340. That is, all of the input lines connected through resistors 340 to a given one of output lines 339a–339j must be at the more positive of two potential levels before that output line becomes sufficiently positive in potential to render a corresponding amplifier conductive. Thus, a positive output signal P–40 is impressed upon a particular one of the output leads 339a–339j corresponding to that one of the characters "0"–"9" stored by the states of the memory devices 330a–330d. Each of the output leads 339a through 339j is, respectively, coupled to the input of an amplifying and phase-inverting device 341a–341j, with the output of all amplifying devices coupled to the base 342b of an emitter amplifier 342. The output terminal 344 of the amplifier 342 is coupled to the punching apparatus 206 (FIG. 24) for the purpose of providing suitable command signals to various punching apparatus components, for example, a punch coil, as hereinafter described.

In review, as each of the thirty-one memory translators 205 is rendered receptive by negative potentials on the X and Y distributor terminals connected thereto, it receives a combination of signals from the terminals 266a–266d that represents the identity of one character. This identity is stored by setting a unique combination of the bistate memory units 330a–330d, which remain set, and which cause a corresponding one of the matrix output lines 339a–339j to reside at a positive potential.

Each of the amplifiers 341a–341j also functions as an "and" gate and can produce no response simply because the associated output line 339a–339j is at a high potential. To provide synchronization between the release of coded information representative of the particular character stored in the memory devices 330a–330d and the punching position for like characters established by the punching apparatus 206, the amplifiers 341a–341j are, respectively, provided with second input terminals 345a–345j. These may be referred to as digit selector terminals. They are successively energized by the punching appartus 206 (to be described below with reference to FIG. 24) as the punches successively perforate the characters "0" through "9" in row-by-row order, as hereinafter explained. Merely by way of explanation, the characters on a particular coupon are serially read by the reading head 45 and the identities of thirty-one successive characters are stored in the thirty-one respective memory translators 205. Rather than to record and punch thirty-one characters in thirty-one successive operations, the punching apparatus 206, here shown as the utilization or final output device is preferably organized to punch or record simultaneously all identical characters. For example, if a group of thirty-one characters includes five "0's" and six "1's," all five "0's" would be punched in the card 39 at one time, and all six "1's" punched simultaneously at a later time. This is termed row-by-row punching. Thus, the punching apparatus 206 would first perforate all of the "0" characters which might be stored on any particular memory units 205. The apparatus would then step to the character "1" position and perforate all of the "1" characters which might be stored on any particular memory translators 205. Such a course of action is followed through each successive character "0" through "9" until all of the coded information stored in the memory translators 205 has been demanded and reproduced on a record card 39.

When the punches are prepared to punch all of the "0" characters, a positive command signal P–41 is impressed, as later described, upon the digit selector terminals 345a for all memory units 205, and those memory units having "0's" stored therein will have simultaneous positive potential inputs P–41 and P–40 to the amplifiers 341 (FIG. 21) applied from the digit selector terminals 345 and the matrix output leads 339 associated therewith. When this condition occurs, a negative output signal P–42 is transmitted from one of the amplifiers 341 to the amplifier 342. The amplifier 342 also functions as an "and" gate, however, having a second input terminal 346 which is coupled directly to the punch suppressor 209 as noted below. Unless this terminal 346 is at a positive potential, there will be no raised potential P–48 at the output terminal 344.

In order to prevent a punching operation if some number other than thirty-one valid characters have been read into the buffer storage assembly 200, provision is made for rendering the punch inhibitor 342 (FIG. 21) in all translator units 205 nonconductive, thereby to prevent a demand punching signal from being delivered to the output terminals 344 and thence to the punching coils. For this purpose the photocell PCD (FIG. 23) is in circuit with the dark cell preamplifier 211 (which may be identical to the preamplifiers illustrated in FIG. 11). Thus, when a coupon being read has moved completely past the reading head 45, light falls on the photocell PCD and a positive potential P–43 is impressed on the input terminal of an amplifying and phase inverting device 349 (FIG. 23). The negative potential P–44 from the device 349 triggers a memory unit 350, e.g., a bistable flip-flop circuit, which is identical in construction to one of the input memory units 231 previously described. The resulting negative potential P–45 from the memory unit 350 is supplied to the input terminal 276 and performs two functions.

First, the output signal of the photocell PCD further serves to prevent false error indications after the trailing edge of the coupon passes the light transmitting apertures 60 (FIG. 10) in the reading head 45. To this end the input terminal 276 of the "and" gate 352 is coupled to the emitter 274e (FIG. 18) in the distributor drive inhibitor 243. Thus, when the coupon 30 is being read the terminal 276 is maintained at ground potential and the amplifier 274 will be conductive when a drive signal is impressed on the base. However, when the photocell is energized after complete passage of the coupon, the terminal 276 goes negative and the amplifier 274 will not conduct in response to a negative drive signal P–12, thus inhibiting the distributor drive.

Secondly, the negative potential P–45 appearing on the terminal 276 forms one input to an "and" gate generally indicated at 352. In the exemplary apparatus which is shown for use in reading coupons having thirty-one characters, the "and" gate 352 includes two other input terminals here shown as terminals Y–2 and X–30 which will both swing negative in potential after the thirty-first valid character has been read. Thus, if thirty-one valid characters have been read into the buffer assembly 200 the X and Y distributors will be in states Y–2, X–30 representing an address for a thirty-second character, thereby creating a negative input potential P–22 on the terminals Y–2 and X–30. Since the photocell PCD has also now sensed the complete passage of the coupon, negative potentials are simultaneously present upon the input terminals 276, Y–2 and X–30. The gate 352 includes unilaterally conductive devices 354 which, under these conditions, produce a negative output potential P–46 on the input terminal 355 of a memory unit 356 (e.g., a bistable flip-flop circuit which may be identical to the memory units 231 illustrated in FIG. 14). This sets the device 356 to that state which results in its output terminal 346 being placed at the more positive of two potential levels. On the other hand, if some number other than thirty-one valid characters have been read into the buffer assembly 200 from one coupon, simultaneous negative potentials will not be impressed upon the terminals Y–2 and X–30 and no negative potential will appear at the input terminal 355. The device 356 will thus not be "set," and the terminal 346 will remain at its lower potential. The devices 350, 356 are respectively provided with second input terminals 351, 357 which are utilized to pass a negative pulse P–30 for resetting purposes.

The output of the bistate device 356 is coupled directly to all the input terminals 346 in the thirty-one translator units 205. As shown in FIG. 21, this terminal 346 is electrically connected to the emitter 342e of the punch inhibitor 342 (FIG. 21). Therefore, unless exactly thirty-one valid characters have been read from a coupon, the terminal 344 will not be raised to the relatively positive potential P–48 when the base 342b swings negative as a result of reading out a character.

It is often desirable when utilizing row-by-row punching apparatus, such as that illustrated diagrammatically at 206 (FIG. 24), to allow the punching apparatus to demand the coded indicia representative of all characters "0" through "9" even though the punches themselves may not be actuated to record certain ones of the ten possible characters. For this purpose the output of the memory unit 356 is also connected to the base 358b of a common emitter amplifier 358 having its collector 358c connected to the terminal 359 of the punch clutch (FIG. 24). The emitter 358e of the amplifier is connected to the digit selector terminal 345a so that when a positive potential P–47 appears at the base and a positive potential P–41 at the emitter, the amplifier 358 becomes nonconductive and its output terminal 359 remains negative. When this occurs the clutch coil is deenergized. On the other hand, if no input signal is received by the memory 356 (i.e., no simultaneous negative potentials occur at the three input terminals of the "and" gate 352), the base 358b remains negative and the amplifier 358 is conductive, thus driving the terminal 359 to a positive level of potential P–49 and energizing the clutch coil.

Referring to FIG. 24, there is diagrammatically illustrated a typical row-by-row indicia-applying apparatus, here shown as a row-by-row punch 206, which may be used to process second documents such as the record card 39 illustrated in FIG. 4. In the exemplary apparatus, the record cards 39 are delivered to a punch carriage 360 by any suitable feed means (not shown). Provision is made for effecting translation of the carriage 360 beneath a row of punches (there being one such punch 361 shown in FIG. 24) in such a manner that the row of punches 361 is successively positioned over each row of character positions $41_0$–$41_9$ respectively. In order to accomplish this the carriage 360 is mounted on a drive shaft 362 by means suitable for translating rotational movement of the shaft 362 to linear movement of the carriage 360. Such means may simply take the form of a pinion gear 364 which is keyed to the shaft 362 and which is meshed with rack teeth 365 formed on the lower side of the carriage 360. To drive the shaft 362, a motor $M_P$ is coupled thereto through a suitable gear reducing mechanism 366 and a slippable coupling 368, it being understood that the coupling 368 may be similar to the coupling 96 shown in FIG. 9.

In order to drive certain of the punches 361 through the record card 39 at particular character positions, provision is made for selecting designated ones of the punches 361, in accordance with information stored in the memory translators 205 (FIG. 11), as each row 41 of characters positions is successively located beneath the punches. To this end, each punch 361 has associated therewith an interposer 369 which is mechanically coupled to the armature 370 of a punch solenoid 371. The coil of the solenoid 371 is electrically connected on one side to the power supply terminal 213 (−12 v.) and on the other side to the output terminal 344 of the punch inhibitor 342 (FIG. 21). The arrangement is such that the interposer 369 is normally held retracted by the punch solenoid 371 when the latter is not energized, i.e., when the particular memory translator 205 associated therewith has stored a character other than the character in the particular row 41 positioned beneath the punches 361. On the other hand, should the memory translator 205 associated with the punch coil 371 have stored therein character information corresponding to the characters in the row 41 then being punched, the punch coil 371 is energized by the positive potential level P–48 appearing at the collector 342c of the punch inhibitor 342 (FIG. 21). Thus, the armature 370 and the interposer 369 are projected forwardly into position with the interposer 369 overlying the upper end of the punch 361.

For simultaneously driving those punches 361 having interposers 369 positioned thereover through selected character positions in the record card 39, a force bar 372 extends over all of the interposers 369. The force bar 372 is drivingly coupled to the pinion gear 364 and a similar gear 364a also mounted on the drive shaft 362 by means of a pair of connecting links 374, 374a which are respectively pinned at 375 to pinion gears 376, 376a. It will be appreciated that by proper selection of the gear diameters, the force bar 372 may be driven downwardly any desired number of times as the card 39 moves under the punches. Thus, in the exemplary apparatus, the gears 364 and 376 are dimensioned so that the latter makes ten revolutions for each revolution of the former and the gear 364 is so coupled to the carriage 360 that a single record card 39 is carried past the punches 361 for each revolution of the gear 364. In this manner, the force bar 372 is driven downwardly each time that a different row 41 of character positions is registered with the lower ends of the punches 361. When this occurs, each punch 361 having an interposer 369 positioned thereover (i.e., each punch associated with a memory translator 205 having a character stored therein corresponding to the row 41 of character positions being punched) is driven downwardly through the record card 39 to form the perforations 42 shown in FIG. 4.

To synchronize the demand for information by the punching apparatus 206, as the rows $41_0$–$41_9$ of character positions are sequentially moved under the punches 361, with the information stored in the memory translators 205, provision is made for releasing character information from particular translators only when the information corresponds with the particular row 41 being punched. To this end, a wiper 378 is mounted on the end of the shaft 362 and insulated therefrom. The wiper is coupled directly to the power supply terminal 215 which is maintained at a potential level of approximately 1.5 v. As the shaft 362 rotates, the wiper sequentially contacts the digit selector terminals 345a–345j which respectively correspond to the rows of character positions $41_0$–$41_9$. Thus, when the punching apparatus is conditioned to perforate all of the "2" characters, for example, the wiper 378 is electrically connected to the digit selector terminal 345c. When this occurs, the terminal 345c has impressed thereon a positive potential level P–41 (FIGS. 21 and 25) while all other digit selector terminals remain at a negative level of potential (referring to FIG. 25, it will be seen that each of the digit selector terminals 345a–345j are normally maintained at a negative level of potential by coupling them to the power supply terminal 213). The positive potential P–41 is then passed to the amplifier 341c (FIGS. 21 and 25). If the amplifier 341c also receives a positive input signal P–40 from the memory translator 205 indicating that the memory has stored therein a character "2," a negative output signal P–42 is transmitted to the base 342b of the punch inhibitor 342. When the latter is conductive, i.e., when a positive potential level P–47 is simultaneously present on the emitter 342e, the terminal 344 is raised to a positive level of potential P–48 and the punch coil 371 is energized by completing a circuit from the power supply terminal 215 (1.5 v.) through the bistable device 356 (FIG. 23), the punch inhibitor 342 (FIG. 21), and the punch coil 371 (FIG. 24) to the power supply terminal 213 (−12 v.).

On the other hand, should the memory translator have other than a character "2" stored therein, no negative potential P–42 will appear at the punch inhibitor base 342b (FIG. 21) and therefore no output signal P–48 will be passed to the terminal 344 and the coil 371 will remain de-energized. Similarly, if an error has been sensed by the buffer storage assembly 200, the emitter 342e of the inhibitor 342 will remain at a negative level of potential and the amplifier 342 will remain nonconductive, again insuring that the input terminal 344 of the punch coil 371 remains at a negative level of potential and the coil is de-energized.

In order to insure that the feeding of record cards 39 through the punching apparatus 206 will terminate whenever a reading irregularity or error is detected by the buffer storage assembly 200, while at the same time insuring that the particular card 39 on the carriage 360 is cycled through the punching apparatus, provision is made for interrupting the drive from the motor $M_P$ to the shaft 362 after the shaft has made one complete revolution. To this end, a lever 379 having a slot 380 formed in one end thereof is pivotally mounted at its opposite end to the frame of the punching apparatus 206. The slot 380 is positioned to receive a pin 381 mounted on the driven member of the slippable coupling 368 and is normally maintained out of contact with the pin by means of a spring 382 secured at its opposite ends to the lever 379 and the punch frame. For raising the lever 379 into position to cause reception of the pin 381 within the slot 380, thus braking the shaft 362, the armature 384 of a clutch solenoid 385 is mechanically coupled to the lever 379 intermediate the ends of the latter. The solenoid coil 385 is electrically connected at one side to the power supply terminal 213 (−12 v.) and at its other side to the output terminal 359 of the amplifier 358 (FIGS. 23 and 25).

Since the emitter 358e of the amplifier 358 is coupled to the digit selector terminal 345a, it is normally maintained at a negative level of potential. However, when the wiper arm 378 is in contact with the digit selector terminal 345a, the emitter 358e is raised to a positive potential level P–41 and if a reading irregularity has been sensed in the buffer storage assembly 200, the base 358b drops to a lower potential level. This results in a momentary positive potential level P–49 at the output terminal 359 and completes an energizing circuit for the coil of the clutch solenoid 385 through the bistable device 356 (FIG. 23), the amplifier 358, and the coil 385 (FIG. 24) to the power supply terminal 213 (−12 v.). When this occurs, the armature 384 of the clutch solenoid 385 is momentarily retracted and the lever 379 is pivoted in a clockwise direction (as viewed in FIG. 24). At the instant when the lever 379 is raised, the clutch pin 381 has just passed the point of registration with the slot 380, as illustrated by the dotted line 381a. Therefore, the slippable coupling 368 and the clutch pin 381 will make one full revolution before the pin is received within the slot 380 and translation of the carriage 360 stopped. Since the error signal has also been transmitted to the punch coils 371, none of the interposers 369 are projected and the card 39 will therefore pass beneath all of the punches 361 without having any information processed thereon. However, no further cards 39 will be fed to the punching apparatus 206 until the lever 379 is pivoted in a counterclockwise direction thus releasing the pin 381 and the clutch 368.

In order to hold the slippable coupling 368 in its declutched condition until the cause of the reading irregularity has been cleared by the operator, provision is made for sealing the clutch solenoid 385 in its energized state. To this end, a normally open limit switch LS4 is mounted on the frame of the punching apparatus 206 and positioned in such a manner that, upon energization of the clutch solenoid 385, the upward movement of the lever 379 closes the normally open contacts $LS4_a$, $LS4_b$ (FIG. 24). As here shown, the contact $LS4_a$ is coupled to the ground terminal 214 through a normally closed pushbutton switch PB and the contact $LS4_b$ is coupled to the clutch coil 385. When a reading irregularity is detected and a momentary positive potential level P–49 passed to the clutch solenoid 385, the solenoid is energized and the lever 379 is pivoted upwardly, thus closing the normally open contacts $LS4_a$, $LS4_b$. A sealing circuit for the solenoid is therefor completed from the ground terminal 214 (+1.5 v.) through the normally closed pushbutton switch PB, the now closed contacts $LS4_a$–$LS4_b$ and through the clutch coil 385 to the power supply terminal 213 (−12 v.). When the operator has removed the cause of the reading irregularity, it is merely necessary to depress the pushbutton PB, thus opening the sealing circuit and de-energizing the clutch solenoid 385. When this occurs, the spring 382 causes counterclockwise movement of the lever 379 (as viewed in FIG. 24) and allows the pin 381 to snap out of registration with the slot 380, again completing the drive to the shaft 362 through the slippable coupling 368.

Turning now to FIG. 25, the control circuitry for synchronizing the reading apparatus 44 and the buffer storage assembly 200 with the punching apparatus 206 is shown. As the drive shaft 362 of the punch is rotated, the wiper 378 will sequentially complete circuits from the power supply terminal 215 (1.5 v.) through the wiper 378 to each of the digit selector terminals 345a–345j. In order to initiate the reading cycle for the next coupon 30 located at the holding station in the feed mechanism of the reading apparatus 44, the input terminal 386 of the reader control 212 is coupled directly to the digit selector terminal 345j corresponding to the character "8" position. Whenever a positive level of potential P–41 appears at the terminal 345j (i.e., when the punching apparatus 206 (FIG. 24) is prepared to process all of the character "8's") it simultaneously appears at the input terminal 386 of the reader control 212, where it is passed through an amplifying and inverting device 388. The amplifying device 388 is coupled directly to the input terminal 389 of the memory unit 390, which may be a bistable device identical to the device illustrated in FIG. 14. Thus, a negative potential level P–50 appears at the input terminal 389. Simultaneously, a negative potential level P–51 appears at the output terminal 391 of the device 390 and is passed to an amplifying and inverting device 392. The output of the inverting device 392 is coupled to a reader relay coil RR. In the exemplary apparatus, the reader relay RR is provided with normally open contacts $RR_1$, $RR_2$ and $RR_3$ and normally closed contacts $RR_4$. The output of the inverting device 392 is a positive going potential level P–52 which completes an energizing circuit through the coil RR to the power supply terminal 213 (−12 v.), thus opening the contacts $RR_4$ and closing the contacts $RR_1$–$RR_3$.

In order to momentarily energize the drum release solenoid 126, closure of the reader relay contacts $RR_3$ completes an energizing circuit for the coil 126 from the ground terminal 214 through the drum release solenoid 126, the closed contacts $RR_3$ the normally closed contacts CS1 of a cam switch CS (FIGS. 6 and 25), and the feed brake limit switch LS1 (which has been closed by the coupon 30 waiting to be read) to the power supply terminal 213 (−12 v.). For holding the read relay RR in an energized condition, a sealing circuit is simultaneously completed from the ground terminal 214 through the normally closed contacts CS2 of the cam switch CS, the relay contacts $RR_1$, and the relay coil RR to the power supply terminal 213 (−12 v.). A third circuit is simultaneously completed from the input terminal 394 of the memory unit 390 through the closed contacts $RR_2$ to the power supply terminal 213 (−12 v.), thus lowering the potential level P–53 at the reset terminal 394 and resetting the memory unit 390 in a manner similar to that described for the memory unit 231 illustrated in FIG. 14.

To insure that the reader drum 51 will move through only a single revolution, provision is made for de-energizing the drum release solenoid 126 after a short current pulse has been impressed thereon. To this end, a cam plate 395 is mounted on the shaft 56 (FIGS. 6 and 25) adjacent the clutch drum 85. The cam plate 395 has formed therein a slot 396 within which is normally received a cam follower 398, the latter being mechanically connected to the cam switch contacts CS1, CS2. After a positive potential level P–41 has been impressed upon the input terminal 386 of the reader control 212, and the energizing circuits have been completed for the drum release solenoid 126, the sealing circuit for the reader relay RR and the reset circuit for the memory unit 390, the clutch drum 85 is rotatably driven by the sprocket 88 and the torque disc 86 (FIG. 6) and the reader drum shaft 56 will begin a revolution. When this occurs, the cam plate 395 and the cam follower 398 serve to open the cam switches CS1, CS2, thus breaking the energizing circuit for the drum release solenoid 126, the sealing circuit for the reader relay RR, and the reset circuit for the memory device 390.

In order to complete the control circuitry, two further control switches are provided. A pair of normally closed switches LS2, LS3 are associated with the stacker assembly 62 (FIG. 5) and connected in series with the motor relay MR. When the stacker assembly 62 is full of completely read coupons, the follower 71 will engage and depress the actuator $LS2_a$ of the limit switch LS2 thus opening the switch and breaking the energizing circuit for the motor relay MR. When this occurs, the motor relay contacts $MR_1$ are opened and the motor $M_R$ for the reading apparatus 44 is turned off. Similarly, a second limit switch LS3 is mounted on the side late 150 (FIG. 5) of the reading apparatus and its actuator $LS3_a$ (FIG. 5) is held normally depressed by the lever 154 on the stacker assembly 62. Whenever the operator opens the stacker assembly, thus effecting clockwise pivotal movement of the lever 154 (as viewed in FIG. 5), the limit switch LS3 is opened and the motor relay MR again drops out, thus stopping the motor $M_R$. For insuring that the reading apparatus 44 will complete a reading cycle even though one or both of the limit switches LS2, LS3 are opened, a capacitor C9 is connected across the motor relay. When either of the switches are opened, the capacitor discharges through the relay MR, thus holding the relay energized for a short interval and insuring that the coupon 30 being read passes through a complete reading cycle.

As illustrated in FIG. 25, the motor $M_R$ for the reading apparatus 44 is connected across an A.C. source represented by terminals 399, 400, and through the normally open motor relay contacts $MR_1$. For insuring a constant light level for the reading head 45, the lamp 58 (FIGS. 6 and 25) is coupled across the output terminals of a full wave rectifier generally indicated at 401, the opposite terminals of the full wave rectifier being connected across the A.C. source. A smoothing capacitor C10 connected across the lamp 58 prevents flicker in the radiated light which would otherwise occur and perhaps produce erroneous responses of the photocells.

Provision is also made for generating a reset signal to simultaneously reset the distributor 204 (FIG. 11), the bistable devices 350, 356 (FIG. 23) and all of the memory translators 205 (FIG. 11). To accomplish this, the digit selector terminal 345j (FIG. 25) is coupled to a monostable device 402 (which may be identical to the monostable multivibrator 256 illustrated in FIG. 15). Thus, when the punching apparatus has demanded the information corresponding to the character "9" position, the positive potential level P–41 appearing at the digit selector terminal 345j is passed to the input terminal 404 of the monostable device 402 through a differentiating capacitor C11. The negative-going trailing edge P–54 of the pulse P–41 is utilized to trigger the monostable device and to provide a negative potential level P–30 at the output terminal 405. This signal is passed through a noninverting amplifier 406 to the input terminal 316 (FIG. 20a) of the distributor reset mechanism 284. Simultaneously, the negative pulse P–30 is transmitted to the input terminals 331a–331d (FIG. 21) for each of the memory units 330 in all of the memory translators 205, and to the reset terminals 351, 357 (FIG. 23) of the bistable devices 350, 356 respectively. Thus, all of the above components are conditioned for reception of signals from the next coupon 30, which has now entered the reading cycle.

The overall operation of the reading apparatus 44 and the electrical circuits associated with the buffer storage assembly 200 may be better understood with reference to FIGS. 26 and 26a which illustrate the variations of the several different signals or responses with time during the sucessive reading of two perforated characters from one coupon 30. The time scales and pulse widths shown in FIGS. 26 and 26a are not intended to be precise or to show actual relative duration; on the contrary, the graphical representations of FIGS. 26 and 26a are intended only to illustrate the general mode of operation of the apparatus.

Let it be assumed that the reader drum 51 (FIG. 8) is stationary and is awaiting a signal to pick up the first coupon 30 located at the holding station (FIG. 8a) in the feeding mechanism. Prior to time instant $t_0$ (FIG. 26), the operator depresses the pushbutton PB (FIG. 25) and initiates operation of the punching apparatus 206. Since no coupon has yet been "read" and no information stored in the buffer storage assembly 200, none of the punch coils 371 will be energized and consequently the punching apparatus 206 will step through an entire punching cycle without processing any information on a record card 39. When the wiper 378 contacts the digit selector terminal 345i (FIGS. 24 and 25), the drum release solenoid 126 (FIGS. 7 and 25) is energized, the drum 51 (FIG. 8a) is released and the first coupon 30 is engaged with the radial teeth 52, 52a, thus carrying the coupon through an arcuate path toward the reading head 45. Momentarily thereafter, the wiper 378 contacts the digit selector terminal 345i. At this instant (identified in FIG. 26 as $t_0$), the distributor 204 is stepped to its starting position with the output terminals Y-1 and X-O maintained at a negative level of potential P-22. Simultaneously, the memory translators 205 are all reset as described above. The columns 34 of perforations in the first-coupon are now moving toward the reading head 45 in position for the character representative indicia to be "read" in serial order.

As the first column 34 (i.e., that column containing perforations in rows 229b and 229c representing the character "6") is registered with the light transmitting apertures 60 (FIG. 10) in the reading head 45, the photocells PC2 and PC4 sense the presence of perforations 36 in the column while the remaining photocells are masked by the coupon 30. Let it also be assumed that the coupon 30 is slightly skewed, or that the perforations 36 appearing in rows 229b and 229c are not precisely alined. In this event, as illustrated in FIG. 26, the photocell PC2 would sense the presence of a perforation an instant before the photocell PC4 would sense the presence of a perforation. Thus, the output of the amplifier 230b (FIG. 13) would appear as a negative potential level P-1 at time instant $t_1$ while the output of the amplifier 230c would appear as a negative potential level P-1 at the time instant $t_2$. The pulses P-1 are then passed to the respective bistable devices 231b, 231c, and positive output potential levels P-2 respectively appear at time instant $t_1$ on the output terminal 232b and at time instant $t_2$ on the output terminal 232c. At time instant $t_1$, the negative pulse P-1 sensed at the terminal 229b is simultaneously transmitted to the input terminal 260 of the enable generator 238 (FIG. 15) as a positive potential level P-6 which is differentiated by the capacitor C2. The duration of the pulse P-6 is determined by the combined durations of the pulses P-1 sensed at the input terminals 229b, 229c. Since the pulse P-1 sensed at the terminal 229b leads the pulse sensed at terminal 229c in point of time (FIG. 26), the former will terminate at time instant $t_3$ while the latter will terminate at time instant $t_4$.

The input pulses P-2 to the decimal translator 233 (FIG. 13) from the input memories 231b, 231c serve to generate at time instant $t_2$ a positive potential level P-3 on the decimal translator output conductor 234g, which level is representative of the character "6" in the decimal code. Simultaneously at time instant $t_2$, a positive potential level P-3 is passed out of the binary translator 235 (FIG. 13) on the output line L-4, which level is representative of the character "6" in the binary code.

At time instant $t_4$, during the negative-going portion P-7 of the "or" gate positive output pulse P-6, the monostable device 256 in the enable generator (FIG. 15) is triggered, thus creating a negative potential level P-8 at the output terminal 255 of the monostable device, which pulse is of a predetermined duration ΔT, hereafter referred to as "read-out time." Thus, at time instant $t_4$, the negative potential level P-8 is inverted by the amplifier 254 (FIG. 15) and impressed upon the emitter 251e of the amplifier 251 associated with the output line L-4 as a positive level P-9, rendering the latter amplifier conductive. At the same instant $t_4$, a positive potential level P-4 appears at the output terminal 253c and a negative potential level P-5 at the output terminal 266c, both output terminals being associated with the enable generator 238.

Referring to FIGS. 21 and 26, it will be appreciated that at time instant $t_4$, there are simultaneously impressed upon the terminals 266c, Y-1 and X-O, negative signals P-5, P-22 and P-22, respectively, thus creating a positive potential level P-40 at the output line 339g of the memory translator 205, which level commences at time instant $t_4$. Since the only distributor output terminals at a negative level of potential during "read-out time" are the terminals Y-1 and X-O, the memory translator 205 associated with the first character position has its bistable devices conditioned to store the character "6" in binary form with a decimal output signal P-40 on the output conductor 339g representative of the character "6."

At time instant $t_4$, the positive output level P-4 sensed at the output terminal 253c in the enable generator 238 is transmitted to the distributor drive 242 (FIG. 18) thus simultaneously placing the input terminal 272 of the distributor drive inhibitor 243 at a negative potential level P-12. Assuming that the character read is a valid character (i.e., perforations at rows 35b and 35c only), the output of the distributor drive inhibitor 243 is a positive pulse P-13. The negative-going trailing edge P13a of the pulse P-13 is utilized at time instant $t_5$ (FIG. 26) to step the Y distributor, thus returning the Y-1 output terminal to a zero potential level and establishing a negative potential level P-22 at the Y distributor output terminal Y-2.

When the monostable device 256 is triggered by the pulse P-7 at time instant $t_4$, a positive pulse P-10 is passed to the reset generator 240 (FIG. 16) and the negative-going portion P-10 is utilized to generate a negative potential level P-11 at the input terminals 241 of all of the memory units 231, thus resetting the memory units 231b and 231c at time instant $t_5$ (FIG. 26). At this instant, the potential levels P-2 and P-3 are restored to their initial states.

Referring to FIG. 26, it will be appreciated that at time instant $t_6$ the various potential levels illustrated are restored to their normal states in readiness to receive signals representative of the character "9" which is stored in the second column 34 in the coupon 30 (FIG. 1). At this instant $t_6$, the distributor output terminals Y-2 and X-O are at a negative level of potential P-22, thus enabling the secondary memory translator 205(2) as shown in FIG. 19. Additionally, the output line 339g of the first memory translator is raised to a positive potential level P-40 representative of the character "6" stored in the first translator 205(1) shown in FIG. 19. It will be apparent that the above sequence of signals in relation to time will be repeated thirty-one times in the interval between the time instant when the punching apparatus 206 (FIG. 24) punches all of the selected character "9" positions on one card 39 and the instant when the punching apparatus is ready to punch all of the selected character "0" positions on the next card 39.

Referring now to FIG. 26a, there are graphically illustrated the various signals which are associated with the punching apparatus 206 as the latter demands the information stored in the buffer storage assembly 200. At time instant $t_x$, the coupon 30 being read will have completely passed the reading head 45 and the output signals from the reading head representative of the thirty-one characters in the perforation field 32 will have been stored in the memory translators 205 of the buffer storage assembly 200. When the trailing edge of the coupon passes the light transmitting passage 61 (FIG. 10) the photocell PCD will be exposed to the light source and a resulting positive potential level P–43 will be passed out of the preamplifier 211 (FIG. 23) at time instant $t_x$. Simultaneously, a negative potential level P–45 appears at the output terminal 276 of the memory unit 350 and a positive potential level P–47 appears at the emitter 342e of the punch inhibitor 342 (FIG. 21), thus rendering the latter conductive and insuring that the information stored in the memory translators 205 will be processed onto the record card 39.

At time instant $t_7$ there will be simultaneous negative signals on the distributor Y–2 and X–30, which terminals are representative of the thirty-second character position (FIG. 19), thus indicating that thirty-one valid characters have been stored in the translators 205. When these signals occur simultaneously with the negative potential level P–45, the punch inhibitor 342 is conductive and the punching apparatus 206 is ready to demand the coded information stored in the memory translators 205.

Thus, at time $t_7$ (FIG. 26a), the wiper 378 on the punching apparatus 206 will step to the digit selector terminal 345a, raising the latter to a positive potential level P–41, and the punch coils 371 associated with each translator having a character "0" stored therein will be energized. Between the time intervals $t_7$ and $t_8$ the punching apparatus 206 will sequentially produce positive signals P–41 on the digit selector terminals 345a–345f and the record card 39 will be processed with information corresponding to the characters "0" through "5" which are stored in diverse memory translators 205. At time instant $t_8$, the punching apparatus will step to the digit selector terminal 345g associated with the character "6," thus raising this terminal to a positive potential level P–41 and producing one positive input signal for the amplifier 341g (FIG. 21). Since there is simultaneously imposed a positive level P–40 on the input line 339g associated with amplifier 341g, the amplifier is conductive and since the punch inhibitor 342 is also simultaneously conductive, a positive potential level P–48 is impressed upon the input terminal 344 of the punch coil 271 thus projecting the associated interposer 369 over its punch 361. During the time interval between instants $t_8$ and $t_9$ while the punch coil 271 is energized, the force bar 372 is driven downwardly (FIG. 24) and drives the punches which have been selected through the record card 39, thus processing thereupon all of the coded indicia stored in the memory translators representative of the character "6."

At time instant $t_9$ the wiper arm 378 steps to the next digit selector terminal 345h (FIG. 25) and the terminal 345g returns to its negative level of potential. When the pulse P–48 terminates, the punch coil 371 is de-energized.

The wiper arm 378 next steps to the digit selector terminal 345i at time instant $t_{10}$ and the punching apparatus 206 is prepared to process all the character "8's" stored in the memory translators. Simultaneously, a positive signal P–41 is transmitted to the read relay RR, thus closing the normally open relay contacts RR$_1$–RR$_3$ and energizing the drum release solenoid 126 (FIGS. 25 and 26a). When this occurs the next successive coupon 30 is started towards the reading head 45.

Finally, the wiper arm 378 steps to the digit selector terminal 345j and the punching apparatus demands all of the information representative of the character "9." Simultaneously, there is impressed a positive potential signal upon the terminal 404 and the negative-going portion P–54 of the signal is utilized at time instant $t_{12}$ to generate a negative reset signal P–30 at the terminal 405 (FIG. 25), which signal is transmitted to the reset terminals 316 and 331 in the distributors and the memory translators respectively, and to the terminals 351 and 357 in the word length detector 209 (FIG. 23). The signal P–30 serves to simultaneously reset the distributor 204 in its initial state and to clear the memory translators 205 for reception of coded information appearing on the next successive coupon 30 now being read by the reading head 45 (FIG. 26a). The bistable devices 350, 356 are also reset at time instant $t_{12}$.

We claim as our invention:

1. In apparatus for serially reading columns of indicia formed on successive documents, which columns are representative of particular diverse characters, the combination comprising, a plurality of indicia sensing elements, a drum, a shaft for supporting said drum in proximity to said elements, a holding station for retaining successive documents adjacent to the surface of said drum, teeth projecting from the surface of said drum for registration with openings formed in each of said documents, power means including a slippable coupling for transmitting torque to rotatably drive said drum whereupon the document retained at said station is engaged by said teeth and carried by the latter through an arcuate path to sequentially register the columns of character representative indicia with said elements in a reading cycle, means for feeding successive documents to said holding station, means for braking said feed means in response to the presence of a document at said station, and means for overcoming the torque transmitted by said coupling upon completion of a reading cycle.

2. In apparatus for serially reading columns of indicia formed on successive documents, which columns are representative of particular diverse characters, the combination comprising, a plurality of indicia sensing elements, a drum, a shaft for supporting said drum in proximity to said elements, a holding station for retaining successive documents adjacent to the surface of said drum, teeth projecting from the surface of said drum for registration with openings formed in each of said documents, means for rotatably driving said drum whereupon the document retained at said station is engaged by said teeth and carried by the latter through an arcuate path to sequentially register the columns of character representative indicia with said elements in a reading cycle, means for feeding successive documents to said holding station, and means for braking said feed means in response to the presence of a document at said station.

3. For use with a data processor of the type which simultaneously processes a document with indicia representative of like characters, apparatus for reading columns of indicia with each column representative of a particular one of diverse characters formed on each of a plurality of successive coupons comprising, in combination, a plurality of indicia sensitive elements, a rotatable surface for sequentially alining said columns of indicia with said elements to produce output signals from the latter representative of the particular character sensed, means for feeding said coupons to said surface one at a time, means for storing all of said signals for utilization by the data processor when processing a document until each column of indicia in any one coupon has been registered with said elements, means for holding said rotatable surface in a stationary position after each coupon has passed said elements, and means for releasing said last named means when the data processor has processed said document with all of the stored signals representative of a particular character.

4. For use with indicia-applying apparatus of the type which simultaneously processes a document with indicia representative of like characters, apparatus for reading columns of indicia with each column representative of diverse characters formed on each of a plurality of successive coupons; the combination comprising, a plurality of indicia sensitive elements, a rotatable surface for sequentially alining said columns of indicia with said elements to produce output signals from the latter representative of the particular character sensed, means for feeding said coupons to said surface one at a time, means formed on said surface for receiving successive coupons from said feed means, means for braking said feed means each time that a coupon is in position to be received by said surface, means for storing all of said signals for utilization by the indicia-applying apparatus when processing a document until all of the columns of indicia in any one coupon have been registered with said elements, and means for holding said rotatable surface in a stationary position after each coupon has passed said elements until the indicia-applying apparatus has processed said document with all of the stored signals representative of a particular character.

5. In apparatus for reading patterns of perforations formed in a document in a rectangular array of rows and columns with the particular combination of perforations in each column representative of a particular character and for transmitting output signals to a data processor representative of the characters read, the combination comprising, a plurality of sensing elements each corresponding to a different one of said rows, means for sequentially alining each of said columns with said sensing elements to produce output signals from those elements registered with a perforation, means for storing all of said output signals representative of the particular characters read for subsequent utilization by the data processor, means for disabling said alining means after a document has been read, and means for enabling said alining means when the stored signals representative of certain of the characters read have been utilized by the data processor.

6. In apparatus for reading patterns of perforations formed in a document in a rectangular array of rows and columns with the particular combination of perforations in each column representative of a particular character and for transmitting output signals to a data processor representative of the characters read, the combination comprising, a plurality of sensing elements each corresponding to a different one of said rows, means for sequentially alining each of said columns with said sensing elements to produce output signals from those elements registered with a perforation, means for feeding documents to said alining means one at a time, means for storing all of said output signals representative of the particular characters read for subsequent utilization by the data processor, means for disabling said alining means after a document has been read, and means for enabling said alining means when the stored signals representative of certain of the characters read have been utilized by the data processor.

7. Apparatus for reading in serial order patterns of perforations representative of particular characters formed on a document for subsequent use by a utilization device comprising, in combination, a light source, a plurality of photosensitive elements spaced from said source, an endless surface adapted to engage each document and to carry the latter between said light source and said photosensitive elements, means on said surface for alining said document relative to the perforation sensitive elements so that those elements sensing the presence of a registered perforation in each pattern produce output signals representative of the particular character formed by said pattern of perforations, a holding station adjacent to said surface for retaining successive documents, means for moving said endless surface through an arcuate path whereupon said alining means engage the document retained at said holding station and carry the latter past said photosensitive elements in a reading cycle, means for storing the character representative output signals produced for release upon demand of the utilization device, means for holding said endless surface in a stationary position after each coupon has passed said elements, and means for releasing said last named means upon release of the stored output signals representative of certain of the characters read.

8. Apparatus for reading in serial order patterns of perforations representative of particular characters formed on a document, comprising in combination, a light source, a plurality of photosensitive elements spaced from said source, an endless surface adapted to engage each document and to carry the latter between said light source and said photosensitive elements, means on said surface for alining said document relative to the perforation sensitive elements so that those elements sensing the presence of a registered perforation in each pattern produce output signals representative of the particular character formed by said pattern of perforations, a holding station adjacent to said surface for retaining successive documents, means for intermittently moving said endless surface through an arcuate path whereupon said alining means engage the document retained at said holding station and carry the latter past said photosensitive elements in a reading cycle, means for feeding documents to said holding station one at a time in endwise relation, and means for braking said feeding means when a document is retained at said holding station.

9. Apparatus for serially reading patterns of perforations representative of particular diverse characters formed in a first document and for transmitting signals representative of the characters read in serial order to a data processor of the type adapted to apply indicia corresponding to the characters read to a second document in a different form comprising, in combination, a cylindrical drum having an arcuate slot formed in the peripheral wall thereof, a light source disposed on one side of said slot, photosensitive elements disposed on the other side of said slot, means for feeding said first documents to said drum one at a time in endwise relation, means for orienting said first documents on said drum in a position overlying said slot, power means for driving said drum to successively register said patterns of perforations with said photosensitive elements, a clutch interposed between said power means and said drum, means for disengaging said clutch when all of the patterns of perforations in any one coupon have passed said photosensitive elements, and means for engaging said clutch when said data processor is applying particular like characters to said second document.

10. Apparatus for serially reading patterns of perforations representative of particular diverse characters formed in a first document and for transmitting signals representative of the characters read in serial order to a data processor of the type adapted to apply indicia corresponding to the characters read to a second document in a different form comprising, in combination, a cylindrical drum having an arcuate slot formed in the peripheral wall thereof, a light source disposed on one side of said slot, photosensitive elements disposed on the other side of said slot, a first document holding station adjacent said drum, means for feeding said first documents to said station one at a time in endwise relation; means for braking said feed means in response to the presence of a document at said station, means for receiving said first documents from said station and orienting the documents on said drum in a position overlying said slot, power means for driving said drum to successively register said patterns of perforations with said photosensitive elements, a clutch interposed between said power means and said drum, means for disengaging said clutch when all of the patterns of perforations in any one coupon have passed the photosensitive elements, and means for engaging said clutch when said data processor is applying particular like characters to said second document.

11. In apparatus for serially reading columns of indicia formed on successive first documents, which columns are representative of particular diverse characters, and for transmitting output signals representative of the particular characters read to a data processor of the type adapted to process second documents in row-by-row order; the combination comprising, a plurality of indicia sensitive elements for producing output signals representative of the presence of particular character indicia, a drum for carrying successive first documents past said elements, a shaft for rotatably supporting said drum in proximity to said elements, a holding station for retaining successive first documents adjacent the surface of said drum, means for feeding successive first documents to said holding station, teeth projecting from the surface of said drum for registration with openings formed in each of said first documents at a reference spacing from said indicia, a slippable coupling having a driving member and a driven member for transmitting a driving torque to said shaft whereupon the document retained at said station is engaged by said teeth and carried by the latter through an arcuate path to sequentially register the columns of character representative indicia with said elements in a reading cycle, means for storing the output signals of said elements during said reading cycle, means for inhibiting rotation of one of said members following a reading cycle, and means for disabling said last named means when the data processor is processing a predetermined row in said second document.

12. For use in a reading apparatus of the type employing a plurality of indicia sensitive elements for serially reading patterns of indicia representative of particular characters formed in a document and a driven endless surface for alining each pattern successively with the indicia sensitive elements, a feed mechanism comprising, in combination, supply means for containing a plurality of said documents, a holding station adjacent said endless surface for holding a document in position to enter a reading cycle, means for feeding said documents one at a time to said holding station in endwise relation, and means responsive to the presence of a document at said holding station for braking said feed means.

References Cited by the Examiner
UNITED STATES PATENTS

| | | | |
|---|---|---|---|
| 2,181,992 | 12/1939 | Chertman | 235—61.11 X |
| 2,294,734 | 9/1942 | Bryce | 235—61.11 X |
| 2,813,150 | 11/1957 | Brustmann et al. | 235—61.11 |
| 2,873,912 | 2/1959 | Bush | 235—61.7 |
| 3,055,582 | 9/1962 | Battison et al. | 235—61.11 |

MALCOLM A. MORRISON, *Primary Examiner.*

DARYL W. COOK, WALTER W. BURNS, JR.,
*Examiners.*